(12) United States Patent
Schiefer et al.

(10) Patent No.: US 9,152,304 B2
(45) Date of Patent: Oct. 6, 2015

(54) SYSTEMS AND METHODS FOR VIRTUAL CONTROL OF A NON-DESTRUCTIVE TESTING SYSTEM

(71) Applicant: General Electric Company, Schenectady, NY (US)

(72) Inventors: Eugene Schiefer, Baldwinsville, NY (US); Michael Stanton Reeder, Jr., Munnsville, NY (US); Kevin Andrew Coombs, Syracuse, NY (US); Rajeshkumar Venugopal, Skaneateles, NY (US)

(73) Assignee: General Electric Company, Schenectady, NY (US)

( * ) Notice: Subject to any disclaimer, the term of this patent is extended or adjusted under 35 U.S.C. 154(b) by 166 days.

(21) Appl. No.: 13/732,261

(22) Filed: Dec. 31, 2012

(65) Prior Publication Data
US 2014/0184524 A1    Jul. 3, 2014

(51) Int. Cl.
G06F 3/041 (2006.01)
G06F 3/0484 (2013.01)
G06F 3/0488 (2013.01)

(52) U.S. Cl.
CPC ............ G06F 3/0484 (2013.01); G06F 3/0488 (2013.01)

(58) Field of Classification Search
None
See application file for complete search history.

(56) References Cited

U.S. PATENT DOCUMENTS

| 6,317,039 | B1 | 11/2001 | Thomason |
| 6,830,545 | B2 | 12/2004 | Bendall |
| 8,059,882 | B2 | 11/2011 | Amidi |
| 8,108,168 | B2 | 1/2012 | Sharp et al. |
| 8,255,170 | B2 | 8/2012 | Kollgaard et al. |
| 2002/0198997 | A1 | 12/2002 | Linthicum et al. |
| 2003/0216173 | A1 | 11/2003 | Gauselmann |
| 2005/0024341 | A1 | 2/2005 | Gillespie et al. |
| 2005/0231475 | A1 | 10/2005 | Law et al. |
| 2008/0076568 | A1 | 3/2008 | Peari et al. |
| 2008/0129704 | A1 | 6/2008 | Pryor |
| 2008/0167081 | A1 | 7/2008 | Eng |
| 2010/0079405 | A1 | 4/2010 | Bernstein |
| 2010/0328203 | A1 | 12/2010 | Hsu |
| 2011/0028790 | A1 | 2/2011 | Farr et al. |
| 2011/0285636 | A1* | 11/2011 | Howard et al. ............... 345/173 |
| 2011/0295427 | A1 | 12/2011 | Motzer et al. |
| 2013/0179801 | A1* | 7/2013 | Audet et al. .................. 715/752 |

FOREIGN PATENT DOCUMENTS

WO      2011056462 A1    5/2011

OTHER PUBLICATIONS

Martin, Michael W., et al., "Improving Mobil Robot Control—Negative Feedback for Touch Interfaces", Technologies for Practical Robot Applications (TePRA), pp. 70-75, Apr. 11-12, 2011.

(Continued)

Primary Examiner — Nicholas Lee
(74) Attorney, Agent, or Firm — Fletcher Yoder, P.C.

(57) ABSTRACT

A non-transitory computer readable medium may comprise instructions configured to display a virtual joystick, a virtual control pad, or a combination thereof and to derive control data based on a manipulation of the virtual joystick, the virtual control pad, or the combination thereof. The instructions may be further configured to communicate the control data to control a component of a non-destructive testing (NDT) device.

22 Claims, 12 Drawing Sheets

(56) References Cited

OTHER PUBLICATIONS

PCT Search Report and Written Opinion issued May 28, 2014 in connection with corresponding PCT Application No. PCT/US2013/070687.
U.S. Appl. No. 13/732,238, filed Dec. 31, 2012, Michael Christopher Domke.
U.S. Appl. No. 13/732,252, filed Dec. 31, 2012, Kevin Andrew Coombs.
U.S. Appl. No. 13/732,281, filed Dec. 31, 2012, Jason Howard Messinger.
U.S. Appl. No. 13/732,293, filed Dec. 31, 2012, Jason Howard Messinger.
U.S. Appl. No. 13/732,303, filed Dec. 31, 2012, Thomas Eldred Lambdin.
U.S. Appl. No. 13/732,268, filed Dec. 31, 2012, Scott Leo Sbihli.
U.S. Appl. No. 13/732,309, filed Dec. 31, 2012, Jason Howard Messinger.
U.S. Appl. No. 13/732,272, filed Dec. 31, 2012, Jason Howard Messinger.
U.S. Appl. No. 13/732,319, filed Dec. 31, 2012, Michael Christopher Domke.
U.S. Appl. No. 13/732,327, filed Dec. 31, 2012, Michael Christopher Domke.
U.S. Appl. No. 13/747,408, filed Jan. 22, 2013, Michael Christopher Domke.
U.S. Appl. No. 13/747,435, filed Jan. 22, 2013, Jason Howard Messinger.
U.S. Appl. No. 13/747,438, filed Jan. 22, 2013, Jason Howard Messinger.
U.S. Appl. No. 13/747,457, filed Jan. 22, 2013, Jason Howard Messinger.
U.S. Appl. No. 13/747,453, filed Jan. 22, 2013, Sekhar Soorianarayanan.
U.S. Appl. No. 13/747,429, filed Jan. 22, 2013, Sekhar Soorianarayanan.
U.S. Appl. No. 13/747,464, filed Jan. 22, 2013, Sekhar Soorianarayanan.
U.S. Appl. No. 13/747,443, filed Jan. 22, 2013, Jason Howard Messinger.
U.S. Appl. No. 13/747,449, filed Jan. 22, 2013, Michael Christopher Domke.
U.S. Appl. No. 13/747,456, filed Jan. 22, 2013, Michael Christopher Domke.
U.S. Appl. No. 13/747,416, filed Jan. 22, 2013, Michael Christopher Domke.
U.S. Appl. No. 13/800,015, filed Mar. 13, 2013, Kevin Andrew Coombs.
Sorrel, Charlie. iControlPad Ships at Last [online], [retrieved on Mar. 21, 2013]. Retrieved from the Internet <URL: http://www.wired.com/gadgetlab/2011/11/icontrolpad-ships-at-last/>.
OmniScan MX [online]. p. 5. Olympus, 2010 [retrieved on Mar. 28, 2013]. Retrieved from the Internet: <URL: www.olympus-ims.com/en/omniscan-mx/>.
Georgeson, Gary. [online], [retrieved on Mar. 28, 2013]. http://www.meetingdata.utcdayton.com/agenda/airworthiness/2012/proceedings/presentations/P5526.pdf.
Phasor XS User's Manual [online]. General Electric: Measurement & Control Solutions. [retrieved on Mar. 28, 2013]. Retrieved from the Internet: <URL: www.ge-mcs.com/download/ultrasound/portable-flaw-detectors/Phasor%20Series/om-phasor-en__rev10.pdf>.
USM Vision 1.2—A Total Weld Inspection Solution to Increase Productivity in New Process Pipework Fabrication [online]. General Electric: Measurement & Control. [retrieved on Mar. 28, 2013]. Retrieved from the Internet: <URL: www.ge-mcs.com/download/ultrasound/portable-flaw-detectors/usm-vision/GEIT-USMVision-20058EN__LR.pdf>.

* cited by examiner

SYSTEMS AND METHODS FOR VIRTUAL CONTROL OF A NON-DESTRUCTIVE TESTING SYSTEM

BACKGROUND

The subject matter disclosed herein relates to non-destructive testing (NDT) systems, and particularly to systems and methods for the remote control of NDT systems.

Certain equipment and facilities, such as power generation equipment and facilities, oil and gas equipment and facilities, aircraft equipment and facilities, manufacturing equipment and facilities, and the like, include a plurality of interrelated systems, and processes. For example, power generation plants may include turbine systems and processes for operating and maintaining the turbine systems. Likewise, oil and gas operations may include carbonaceous fuel retrieval systems and processing equipment interconnected via pipelines. Similarly, aircraft systems may include airplanes and maintenance hangars useful in maintaining airworthiness and providing for maintenance support. During equipment operations, the equipment may degrade, encounter undesired conditions such as corrosion, wear and tear, and so on, potentially affecting overall equipment effectiveness. Certain inspection techniques, such as non-destructive inspection techniques or non-destructive testing (NDT) techniques, may be used to detect undesired equipment conditions.

In a conventional NDT system, data may be shared with other NDT operators or personnel using portable memory devices, paper, of through the telephone. As such, the amount of time to share data between NDT personnel may depend largely on the speed at which the physical portable memory device is physically dispatched to its target. Accordingly, it would be beneficial to improve the data sharing capabilities of the NDT system, for example, to more efficiently test and inspect a variety of systems and equipment.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a non-transitory computer readable medium may comprise instructions configured to display a virtual joystick, a virtual control pad, or a combination thereof and to derive control data based on a manipulation of the virtual joystick, the virtual control pad, or the combination thereof. The instructions may be further configured to communicate the control data to control a component of a non-destructive testing (NDT) device.

In another embodiment, a system may include a control device comprising a touchscreen and a processor configured to display an image or a video based on a signal transmitted from a non-destructive testing (NDT) device on the touchscreen. The processor is additionally configured to derive a control data based on a manipulation of the touchscreen, and to use the control data to control a component of the non-destructive testing (NDT) device.

In yet another embodiment, a method may include displaying a virtual joystick, a virtual control pad, or a combination thereof. The method further includes deriving control data based on a manipulation of the virtual joystick, the virtual control pad, or the combination thereof. The method additionally communicating the control data to control a component of a non-destructive testing (NDT) device.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
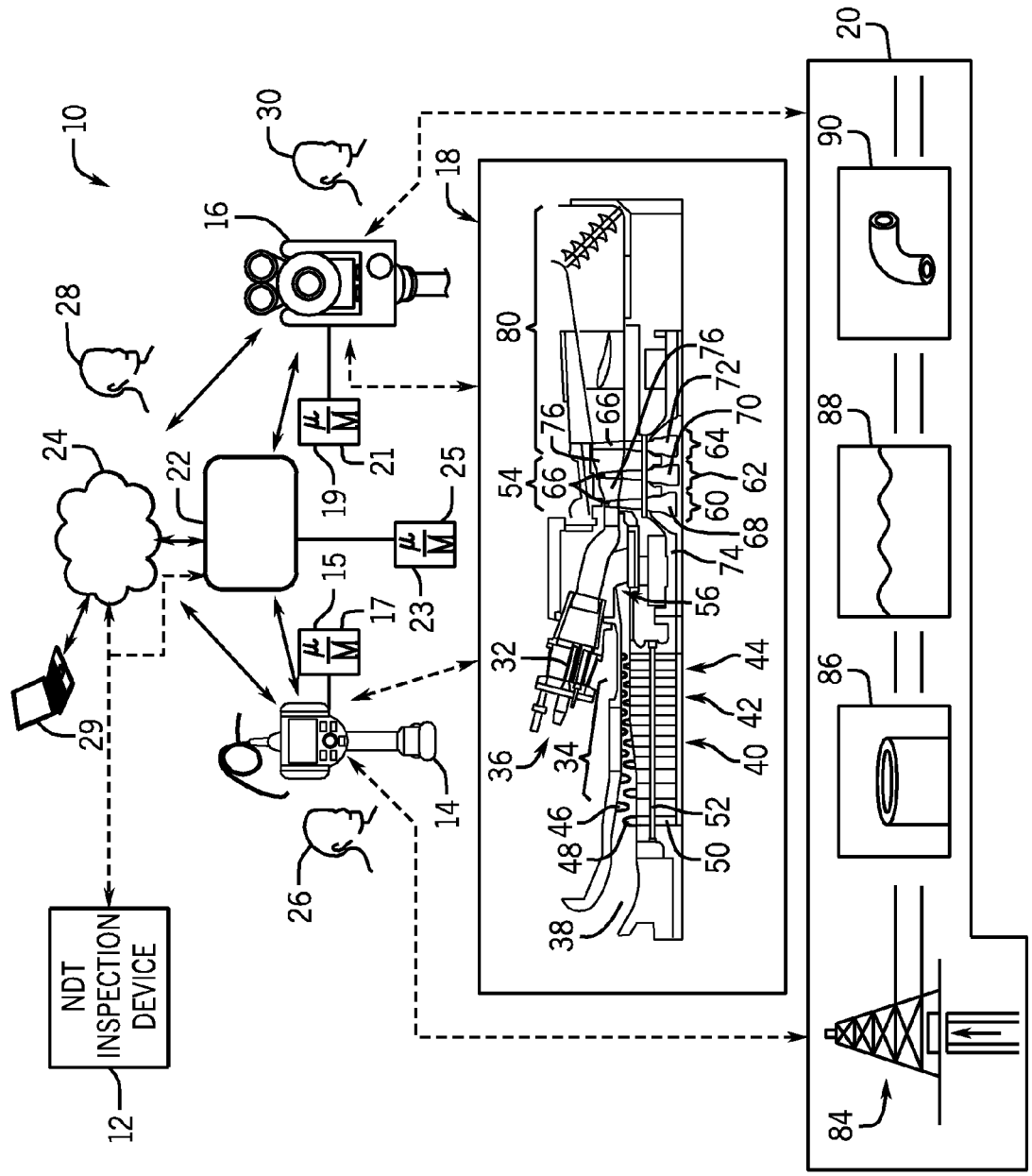
FIG. 1 is a block diagram illustrating an embodiment of a distributed non-destructive testing (NDT) system, including a mobile device.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Embodiments of the present disclosure may apply to a variety of inspection and testing techniques, including non-destructive testing (NDT) or inspection systems. In the NDT system, certain techniques such as borescopic inspection, weld inspection, remote visual inspections, x-ray inspection, ultrasonic inspection, eddy current inspection, and the like, may be used to analyze and detect a variety of conditions, including but not limited to corrosion, equipment wear and tear, cracking, leaks, and so on. The techniques described herein provide for improved NDT systems suitable for bore-scopic inspection, remote visual inspections, x-ray inspection, ultrasonic inspection, and/or eddy current inspection, enabling enhanced data gathering, data analysis, inspection/testing processes, and NDT collaboration techniques.

The improved NDT systems described herein may include inspection equipment using wireless conduits suitable for communicatively coupling the inspection equipment to mobile devices, such as tablets, smart phones, and augmented reality eyeglasses; to computing devices, such as notebooks, laptops, workstations, personal computers; and to "cloud" computing systems, such as cloud-based NDT ecosystems, cloud analytics, cloud-based collaboration and workflow systems, distributed computing systems, expert systems and/or knowledge-based systems. Indeed, the techniques described herein may provide for enhanced NDT data gathering, analysis, and data distribution, thus improving the detection of undesired conditions, enhancing maintenance activities, and increasing returns on investment (ROI) of facilities and equipment.

In one embodiment, a tablet may be communicatively coupled to the NDT inspection device (e.g., borescope, transportable pan-tilt-zoom camera, eddy current device, x-ray inspection device, ultrasonic inspection device), such as a MENTOR™ NDT inspection device, available from General Electric, Co., of Schenectady, N.Y., and used to provide, for example, enhanced wireless display capabilities, remote control, data analytics and/or data communications to the NDT inspection device. While other mobile devices may be used, the use of the tablet is apt, however, insofar as the tablet may provide for a larger, higher resolution display, more powerful processing cores, an increased memory, and improved battery life. Accordingly, the tablet may address certain issues, such as providing for improved visualization of data, improving the manipulatory control of the inspection device, and extending collaborative sharing to a plurality of external systems and entities.

Keeping the foregoing in mind, the present disclosure is directed towards sharing data acquired from the NDT system and/or control of applications and/or devices in the NDT system. Generally, data generated from the NDT system may be automatically distributed to various people or groups of people using techniques disclosed herein. Moreover, content displayed by an application used to monitor and/or control devices in the NDT system may be shared between individuals to create a virtual collaborative environment for monitoring and controlling the devices in the NDT system.

By way of introduction, and turning now to FIG. 1, the figure is a block diagram of an embodiment of distributed NDT system 10. In the depicted embodiment, the distributed NDT system 10 may include one or more NDT inspection devices 12. The NDT inspection devices 12 may be divided into at least two categories. In one category, depicted in FIG. 1, the NDT inspection devices 12 may include devices suitable for visually inspecting a variety of equipment and environments. In another category, described in more detail with respect to FIG. 2 below, the NDT devices 12 may include devices providing for alternatives to visual inspection modalities, such as x-ray inspection modalities, eddy current inspection modalities, and/or ultrasonic inspection modalities.

In the depicted first example category of FIG. 1, the NDT inspection devices 12 may include a borescope 14 having one or more processors 15 and a memory 17, and a transportable pan-tilt-zoom (PTZ) camera 16 having one or more processors 19 and a memory 21. In this first category of visual inspection devices, the bore scope 14 and PTZ camera 16 may be used to inspect, for example, a turbo machinery 18, and a facility or site 20. As illustrated, the bore scope 14 and the PTZ camera 16 may be communicatively coupled to a mobile device 22 also having one or more processors 23 and a memory 25. The mobile device 22 may include, for example, a tablet, a cell phone (e.g., smart phone), a notebook, a laptop, or any other mobile computing device. The use of a tablet, however, is apt insofar as the tablet provides for a good balance between screen size, weight, computing power, and battery life. Accordingly, in one embodiment, the mobile device 22 may be the tablet mentioned above, available from General Electric Co., of Schenectady, N.Y., and providing for touchscreen input. The mobile device 22 may be communicatively coupled to the NDT inspection devices 12, such as the bore scope 14 and/or the PTZ camera 16, through a variety of wireless or wired conduits. For example, the wireless conduits may include WiFi (e.g., Institute of Electrical and Electronics Engineers [IEEE] 802.11X), cellular conduits (e.g., high speed packet access [HSPA], HSPA+, long term evolution [LTE], WiMax), near field communications (NFC), Bluetooth, personal area networks (PANs), and the like. The wireless conduits may use a variety of communication protocols, such as TCP/IP, UDP, SCTP, socket layers, and so on. In certain embodiments, the wireless or wired conduits may include secure layers, such as secure socket layers (SSL), virtual private network (VPN) layers, encrypted layers, challenge key authentication layers, token authentication layers, and so on. Wired conduits may include proprietary cabling, RJ45 cabling, co-axial cables, fiber optic cables, and so on.

Additionally or alternatively, the mobile device 22 may be communicatively coupled to the NDT inspection devices 12, such as the borescope 14 and/or the PTZ camera 16, through the "cloud" 24. Indeed, the mobile device 22 may use the cloud 24 computing and communications techniques (e.g., cloud-computing network), including but not limited to HTTP, HTTPS, TCP/IP, service oriented architecture (SOA) protocols (e.g., simple object access protocol [SOAP], web services description languages (WSDLs)) to interface with the NDT inspection devices 12 from any geographic location, including geographic locations remote from the physical location about to undergo inspection. Further, in one embodiment, the mobile device 22 may provide "hot spot" functionality in which mobile device 22 may provide wireless access point (WAP) functionality suitable for connecting the NDT inspection devices 12 to other systems in the cloud 24. Accordingly, collaboration may be enhanced by providing for multi-party workflows, data gathering, and data analysis.

For example, a borescope operator 26 may physically manipulate the borescope 14 at one location, while a mobile device operator 28 may use the mobile device 22 to interface with and physically manipulate the bore scope 14 at a second location through remote control techniques. The second location may be proximate to the first location, or geographically distant from the first location. Likewise, a camera operator 30 may physically operate the PTZ camera 16 at a third location, and the mobile device operator 28 may remote control PTZ camera 16 at a fourth location by using the mobile device 22. The fourth location may be proximate to the third location, or geographically distant from the third location. Any and all control actions performed by the operators 26 and 30 may be additionally performed by the operator 28 through the mobile device 22. Additionally, the operator 28 may communicate with the operators 26 and/or 30 by using the devices 14, 16, and 22 through techniques such as voice over IP (VOIP), virtual whiteboarding, text messages, and the like. By providing for remote collaboration techniques between the operator 28 operator 26, and operator 30, the techniques described herein may provide for enhanced workflows and increase resource efficiencies. Indeed, nondestructive testing processes may leverage the communicative coupling of the cloud 24 with the mobile device 22, the NDT inspection devices 12, and external systems coupled to the cloud 24.

In one mode of operation, the mobile device 22 may be operated by the bore scope operator 26 and/or the camera operator 30 to leverage, for example, a larger screen display, more powerful data processing, as well as a variety of interface techniques provided by the mobile device 22, as described in more detail below. Indeed, the mobile device 22 may be operated alongside or in tandem with the devices 14 and 16 by the respective operators 26 and 30. This enhanced flexibility provides for better utilization of resources, including human resources, and improved inspection results.

Whether controlled by the operator 28, 26, and/or 30, the borescope 14 and/or PTZ camera 16 may be used to visually inspect a wide variety of equipment and facilities. For example, the bore scope 14 may be inserted into a plurality of borescope ports and other locations of the turbomachinery 18, to provide for illumination and visual observations of a number of components of the turbomachinery 18. In the depicted embodiment, the turbo machinery 18 is illustrated as a gas turbine suitable for converting carbonaceous fuel into mechanical power. However, other equipment types may be inspected, including compressors, pumps, turbo expanders, wind turbines, hydroturbines, industrial equipment, and/or residential equipment. The turbomachinery 18 (e.g., gas turbine) may include a variety of components that may be inspected by the NDT inspection devices 12 described herein.

With the foregoing in mind, it may be beneficial to discuss certain turbomachinery 18 components that may be inspected by using the embodiments disclosed herein. For example, certain components of the turbomachinery 18 depicted in FIG. 1, may be inspected for corrosion, erosion, cracking, leaks, weld inspection, and so on. Mechanical systems, such as the turbomachinery 18, experience mechanical and thermal stresses during operating conditions, which may require periodic inspection of certain components. During operations of the turbomachinery 18, a fuel such as natural gas or syngas, may be routed to the turbomachinery 18 through one or more fuel nozzles 32 into a combustor 36. Air may enter the turbomachinery 18 through an air intake section 38 and may be compressed by a compressor 34. The compressor 34 may include a series of stages 40, 42, and 44 that compress the air. Each stage may include one or more sets of stationary vanes 46 and blades 48 that rotate to progressively increase the pressure to provide compressed air. The blades 48 may be attached to rotating wheels 50 connected to a shaft 52. The compressed discharge air from the compressor 34 may exit the compressor 34 through a diffuser section 56 and may be directed into the combustor 36 to mix with the fuel. For example, the fuel nozzles 32 may inject a fuel-air mixture into the combustor 36 in a suitable ratio for optimal combustion, emissions, fuel consumption, and power output. In certain embodiments, the turbomachinery 18 may include multiple combustors 36 disposed in an annular arrangement. Each combustor 36 may direct hot combustion gases into a turbine 54.

As depicted, the turbine 54 includes three separate stages 60, 62, and 64 surrounded by a casing 76. Each stage 60, 62, and 64 includes a set of blades or buckets 66 coupled to a respective rotor wheel 68, 70, and 72, which are attached to a shaft 74. As the hot combustion gases cause rotation of turbine blades 66, the shaft 74 rotates to drive the compressor 34 and any other suitable load, such as an electrical generator. Eventually, the turbomachinery 18 diffuses and exhausts the combustion gases through an exhaust section 80. Turbine components, such as the nozzles 32, intake 38, compressor 34, vanes 46, blades 48, wheels 50, shaft 52, diffuser 56, stages 60, 62, and 64, blades 66, shaft 74, casing 76, and exhaust 80, may use the disclosed embodiments, such as the NDT inspection devices 12, to inspect and maintain said components.

Additionally, or alternatively, the PTZ camera 16 may be disposed at various locations around or inside of the turbo machinery 18, and used to procure visual observations of these locations. The PTZ camera 16 may additionally include one or more lights suitable for illuminating desired locations, and may further include zoom, pan and tilt techniques described in more detail below with respect to FIG. 4, useful for deriving observations around in a variety of difficult to reach areas. The borescope 14 and/or the camera 16 may be additionally used to inspect the facilities 20, such as an oil and gas facility 20. Various equipment such as oil and gas equipment 84, may be inspected visually by using the borescope 14 and/or the PTZ camera 16. Advantageously, locations such as the interior of pipes or conduits 86, underwater (or underfluid) locations 88, and difficult to observe locations such as locations having curves or bends 90, may be visually inspected by using the mobile device 22 through the borescope 14 and/or PTZ camera 16. Accordingly, the mobile device operator 28 may more safely and efficiently inspect the equipment 18, 84 and locations 86, 88, and 90, and share observations in real-time or near real-time with location geographically distant from the inspection areas. It is to be understood that other NDT inspection devices 12 may be use the embodiments described herein, such as fiberscopes (e.g., articulating fiberscope, non-articulating fiberscope), and remotely operated vehicles (ROVs), including robotic pipe inspectors and robotic crawlers.

Figure 2:
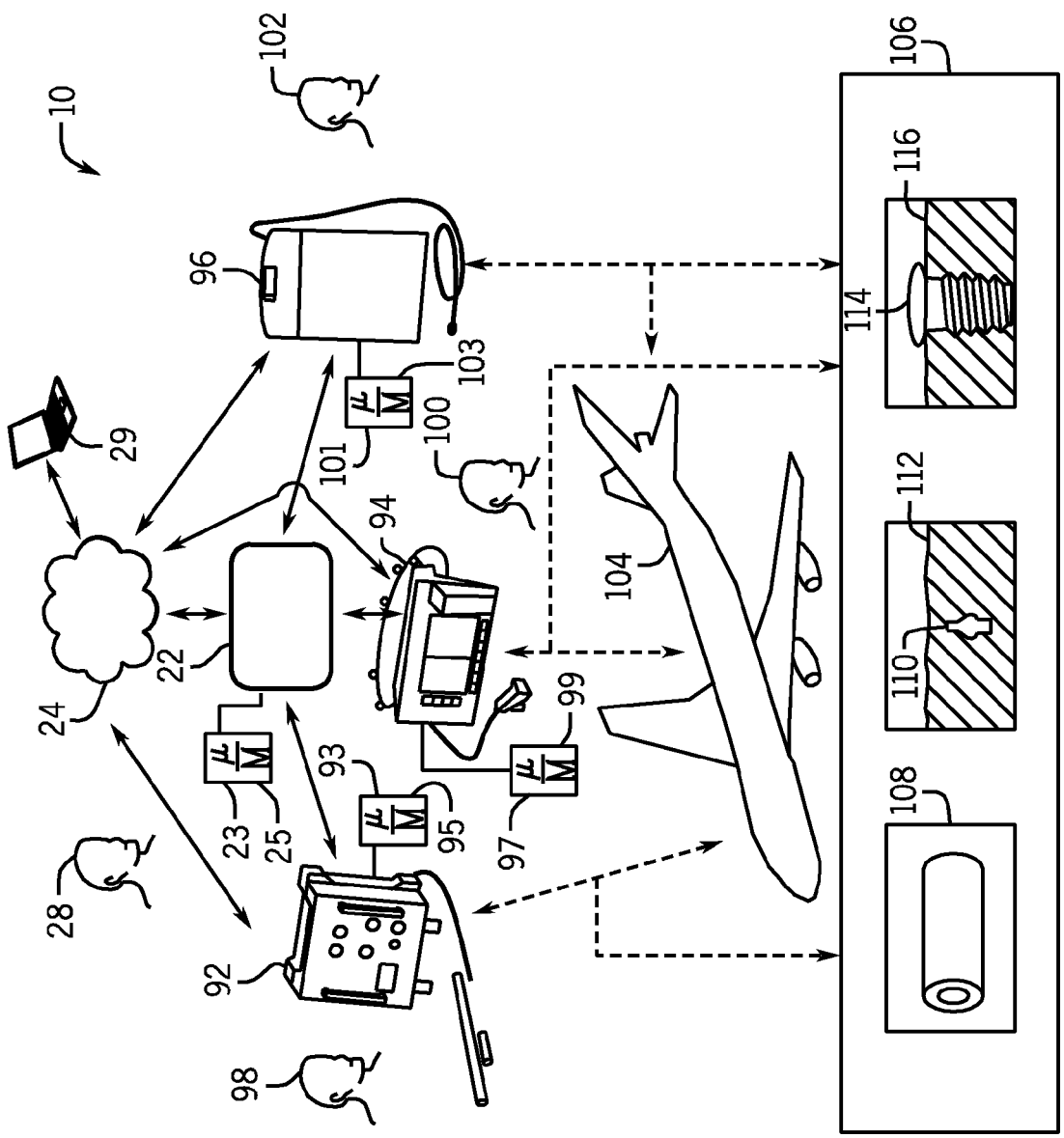
FIG. 2 is a block diagram illustrating further details of an embodiment of the distributed NDT system of FIG. 1.

Turning now to FIG. 2, the figure is a block diagram of an embodiment of the distributed NDT system 10 depicting the second category of NDT inspection devices 12 that may be able to provide for alternative inspection data to visual inspection data. For example, the second category of NDT inspection devices 12 may include an eddy current inspection device 92, an ultrasonic inspection device, such as an ultrasonic flaw detector 94, and an x-ray inspection device, such a digital radiography device 96. The eddy current inspection device 92 may include one or more processors 93 and a memory 95. Likewise, the ultrasonic flaw detector 94 may include one or more processors 97 and a memory 104. Similarly, the digital radiography device 96 may include one or more processors 101 and a memory 103. In operations, the eddy current inspection device 92 may be operated by an eddy current operator 98, the ultrasonic flaw detector 94 may be operated by an ultrasonic device operator 100, and the digital radiography device 96 may be operated by a radiography operator 102.

As depicted, the eddy current inspection device 92, the ultrasonic flaw detector 94, and the digital radiography inspection device 96, may be communicatively coupled to the mobile device 22 by using wired or wireless conduits, including the conduits mentioned above with respect to FIG. 1. Additionally, or alternatively, the devices 92, 94, and 96 may be coupled to the mobile device 22 by using the cloud 24, for example the borescope 14 may be connected to a cellular "hotspot," and use the hotspot to connect to one or more experts in borescopic inspection and analysis. Accordingly, the mobile device operator 28 may remotely control various aspects of operations of the devices 92, 94, and 96 by using the mobile device 22, and may collaborate with the operators 98, 100, and 102 through voice (e.g., voice over IP [VOIP]), data sharing (e.g., whiteboarding), providing data analytics, expert support and the like, as described in more detail herein.

Accordingly, it may be possible to enhance the visual observation of various equipment, such as an aircraft system 104 and facilities 106, with x-ray observation modalities, ultrasonic observation modalities, and/or eddy current observation modalities. For example, the interior and the walls of pipes 108 may be inspected for corrosion and/or erosion. Likewise, obstructions or undesired growth inside of the pipes 108 may be detected by using the devices 92, 94, and/or 96. Similarly, fissures or cracks 110 disposed inside of certain ferrous or non-ferrous material 112 may be observed. Additionally, the disposition and viability of parts 114 inserted inside of a component 116 may be verified. Indeed, by using the techniques described herein, improved inspection of equipment and components 104, 108, 112 and 116 may be provided. For example, the mobile device 22 may be used to interface with and provide remote control of the devices 14, 16, 92, 94, and 96.

Figure 3:
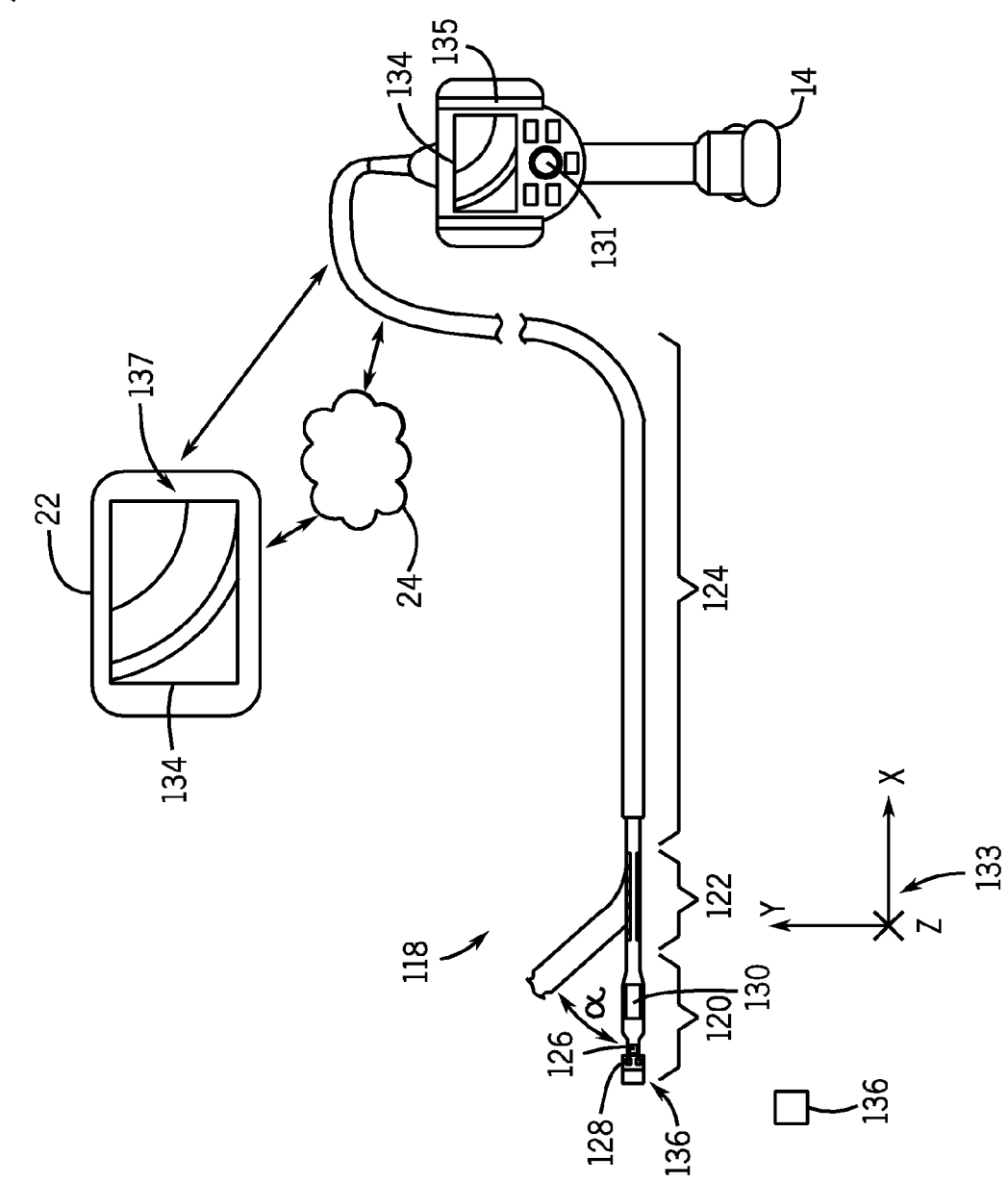
FIG. 3 is a front view illustrating an embodiment of a borescope system 14 communicatively coupled to the mobile device of FIG. 1 and a "cloud;"

FIG. 3 is a front view of the borescope 14 coupled to the mobile device 22 and the cloud 24. Accordingly, the boresecope 14 may provide data to any number of devices connected to the cloud 24 or inside the cloud 24. As mentioned above, the mobile device 22 may be used to receive data from the borescope 14, to remote control the borescope 14, or a combination thereof. Indeed, the techniques described herein enable, for example, the communication of a variety of data from the borescope 14 to the mobile device 22, including but not limited to images, video, and sensor measurements, such as temperature, pressure, flow, clearance (e.g., measurement between a stationary component and a rotary component), and distance measurements. Likewise, the mobile device 22 may communicate control instructions, reprogramming instructions, configuration instructions, and the like, as described in more detail below.

As depicted the borescope 14, includes an insertion tube 118 suitable for insertion into a variety of location, such as inside of the turbomachinery 18, equipment 84, pipes or conduits 86, underwater locations 88, curves or bends 90, varies locations inside or outside of the aircraft system 104, the interior of pipe 108, and so on. The insertion tube 118 may include a head end section 120, an articulating section 122, and a conduit section 124. In the depicted embodiment, the head end section 120 may include a camera 126, one or more lights 128 (e.g., LEDs), and sensors 130. As mentioned above, the borescope's camera 126 may provide images and video suitable for inspection. The lights 128 may be used to provide for illumination when the head end 120 is disposed in locations having low light or no light.

During use, the articulating section 122 may be controlled, for example, by the mobile device 22 and/or a physical joy stick 131 disposed on the borescope 14. The articulating sections 122 may steer or "bend" in various dimensions. For example, the articulation section 122 may enable movement of the head end 120 in an X-Y plane X-Z plane and/or Y-Z plane of the depicted XYZ axes 133. Indeed, the physical joystick 131 and/or the mobile device 22 may both be used alone or in combination, to provide control actions suitable for disposing the head end 120 at a variety of angles, such as the depicted angle α. In this manner, the borescope head end 120 may be positioned to visually inspect desired locations. The camera 126 may then capture, for example, a video 134, which may be displayed in a screen 135 of the borescope 14 and a screen 137 of the mobile device 22, and may be recorded by the borescope 14 and/or the mobile device 22. In one embodiment, the screens 135 and 137 may be multi-touchscreens using capacitance techniques, resistive techniques, infrared grid techniques, and the like, to detect the touch of a stylus and/or one or more human fingers. Additionally or alternatively, images and the video 134 may be transmitted into the cloud 24.

Other data, including but not limited to sensor 130 data, may additionally be communicated and/or recorded by the borescope 14. The sensor 130 data may include temperature data, distance data, clearance data (e.g., distance between a rotating and a stationary component), flow data, and so on. In certain embodiments, the borescope 14 may include a plurality of replacement tips 136. For example, the replacement tips 136 may include retrieval tips such as snares, magnetic tips, gripper tips, and the like. The replacement tips 136 may additionally include cleaning and obstruction removal tools, such as wire brushes, wire cutters, and the like. The tips 136 may additionally include tips having differing optical characteristics, such as focal length, stereoscopic views, 3-dimensional (3D) phase views, shadow views, and so on. Additionally or alternatively, the head end 120 may include a removable and replaceable head end 120. Accordingly, a plurality of head ends 120 may be provided at a variety of diameters, and the insertion tube 118 maybe disposed in a number of locations having openings from approximately one millimeter to ten millimeters or more. Indeed, a wide variety of equipment and facilities may be inspected, and the data may be shared through the mobile device 22 and/or the cloud 24.

Figure 4:
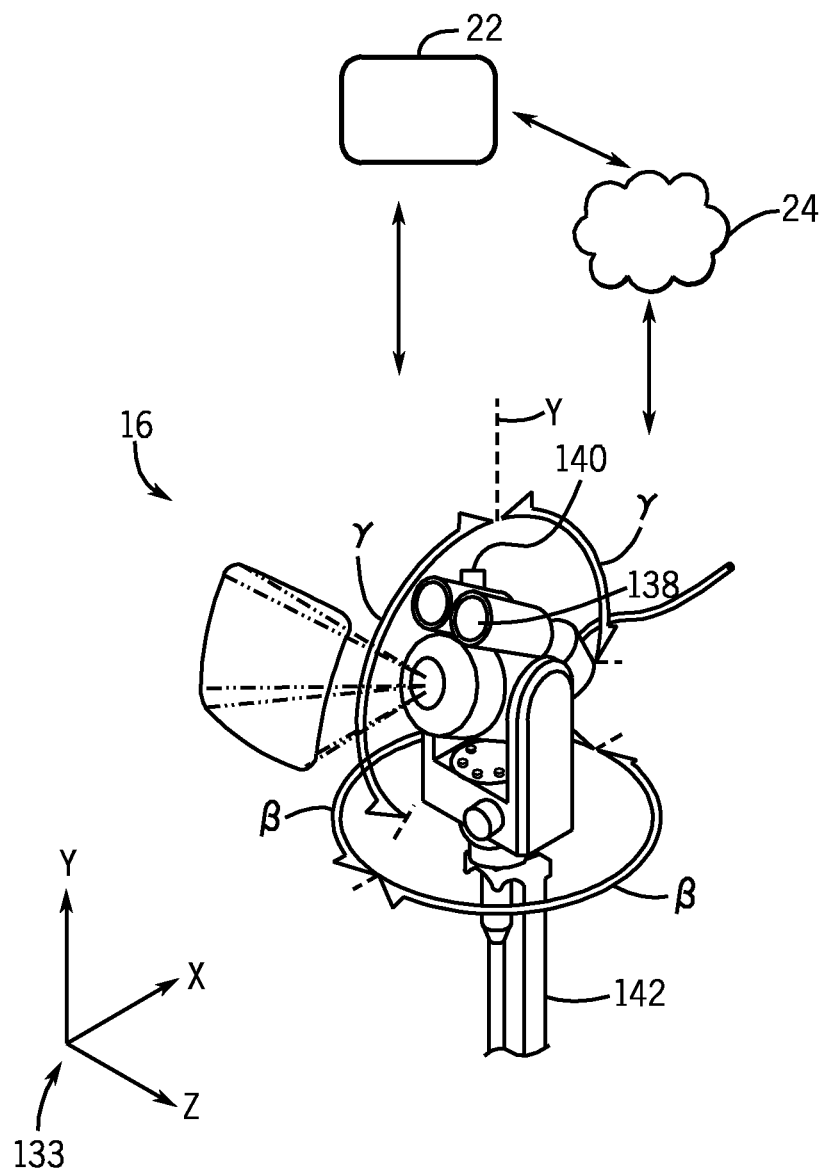
FIG. 4 is an illustration of an embodiment of a pan-tilt-zoom (PTZ) camera system communicatively coupled to the mobile device of FIG. 1.

FIG. 4 is a perspective view of an embodiment of the transportable PTZ camera 16 communicatively coupled to the mobile device 22 and to the cloud 24. As mentioned above, the mobile device 22 and/or the cloud 24 may remotely manipulate the PTZ camera 16 to position the PTZ camera 16 to view desired equipment and locations. In the depicted example, the PTZ camera 16 may be tilted and rotated about the Y-axis. For example, the PTZ camera 16 may be rotated at an angle θ between approximately 0° to 180°, 0° to 270°, 0° to 360°, or more about the Y-axis. Likewise, the PTZ camera 16 may be tilted, for example, about the Y-X plane at an angle γ of approximately 0° to 100°, 0° to 120°, 0° to 150°, or more with respect to the Y-Axis. Lights 138 may be similarly controlled, for example, to active or deactivate, and to increase or decrease a level of illumination (e.g., lux) to a desired value. Sensors 140, such as a laser rangefinder, may also be mounted onto the PTZ camera 16, suitable for measuring distance to certain objects. Other sensors 140 may be used, including long-range temperature sensors (e.g., infrared temperature sensors), pressure sensors, flow sensors, clearance sensors, and so on.

The PTZ camera 16 may be transported to a desired location, for example, by using a shaft 142. The shaft 142 enables the camera operator 30 to move the camera and to position the camera, for example, inside of locations 86, 108, underwater 88, into hazardous (e.g., hazmat) locations, and so on. Additionally, the shaft 142 may be used to more permanently secure the PTZ camera 16 by mounting the shaft 142 onto a permanent or semi-permanent mount. In this manner, the PTZ camera 16 may be transported and/or secured at a desired location. The PTZ camera 16 may then transmit, for example by using wireless techniques, image data, video data, sensor 140 data, and the like, to the mobile device 22 and/or cloud 24. Accordingly, data received from the PTZ camera 16 may be remotely analyzed and used to determine the condition and suitability of operations for desired equipment and facilities. Indeed, the techniques described herein may provide for a comprehensive inspection and maintenance process suitable for planning, inspecting, analyzing, and/or sharing a variety of data by using the aforementioned devices 12, 14, 16, 22, 92, 94, 96, and the cloud 24, as described in more detail below with respect to FIG. 5.

Figure 5:
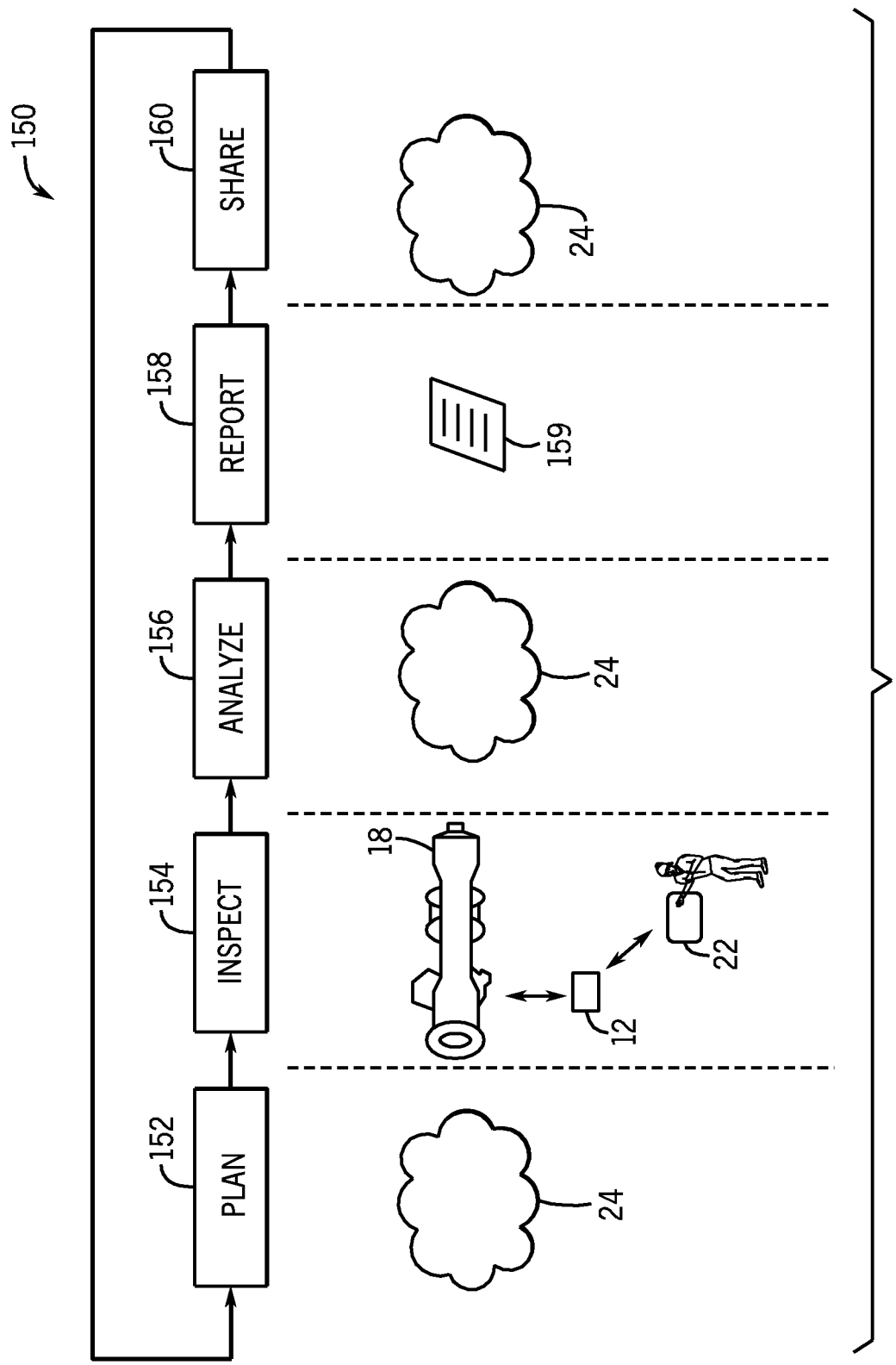
FIG. 5 is a flowchart illustrating an embodiment of a process useful in using the distributed NDT system for planning, inspecting, analyzing, reporting, and sharing of data, such as inspection data.

FIG. 5 is a flowchart of an embodiment of a process 150 suitable for planning, inspecting, analyzing, and/or sharing a variety of data by using the aforementioned devices 12, 14, 16, 22, 92, 94, 96, and the cloud 24. Indeed, the techniques described herein may use the devices 12, 14, 16, 22, 92, 94, 96 to enable processes, such as the depicted process 150, to more efficiently support and maintain a variety of equipment. In certain embodiments, the process 150 or portions of the process 150 may be included in non-transitory computer-readable media stored in memory, such as the memory 17, 21, 25, 95, 99, 103 and executable by one or more processors, such as the processors 15, 19, 23, 93, 97, 101.

In one example, the process 150 may plan (block 152) for inspection and maintenance activities. Data acquired by using the devices 12, 14, 16, 22, 42, 44, 46, an others, such as fleet data acquired from a fleet of turbomachinery 18, from equipment users (e.g., aircraft 54 service companies), and/or equipment manufacturers, may be used to plan (block 152) maintenance and inspection activities, more efficient inspection schedules for machinery, flag certain areas for a more detailed inspection, and so on. The process 150 may then enable the use of a single mode or a multi-modal inspection (block 154) of desired facilities and equipment (e.g., turbomachinery 18). As mentioned above, the inspection (block 154) may use any one or more of the NDT inspection devices 12 (e.g., borescope 14, PTZ camera 16, eddy current inspection device 92, ultrasonic flaw detector 94, digital radiography device 96), thus providing with one or more modes of inspection (e.g., visual, ultrasonic, eddy current, x-ray). In the depicted embodiment, the mobile device 22 may be used to remote control the NDT inspection devices 12, to analyze data communicated by the NDT inspection devices 12, to provide for additional functionality not included in the NDT inspection devices 12 as described in more detail herein, to record data from the NDT inspection devices 12, and to guide the inspection (block 154), for example, by using menu-driven inspection (MDI) techniques, among others.

Results of the inspection (block 154), may then be analyzed (block 156), for example, by using the NDT device 12, by transmitting inspection data to the cloud 24, by using the mobile device 22, or a combination thereof. The analysis may include engineering analysis useful in determining remaining life for the facilities and/or equipment, wear and tear, corrosion, erosion, and so forth. The analysis may additionally include operations research (OR) analysis used to provide for more efficient parts replacement schedules, maintenance schedules, equipment utilization schedules, personnel usage schedules, new inspection schedules, and so on. The analysis (block 156) may then be reported (block 158), resulting in one or more reports 159, including reports created in or by using the cloud 24, detailing the inspection and analysis performed and results obtained. The reports 159 may then be shared (block 160), for example, by using the cloud 24, the mobile device 22, and other techniques, such as workflow sharing techniques. In one embodiment, the process 150 may be iterative, thus, the process 150 may iterate back to planning (block 152) after the sharing (block 160) of the reports 159. By providing for embodiments useful in using the devices (e.g., 12, 14, 16, 22, 92, 94, 96) described herein to plan, inspect, analyze, report, and share data, the techniques described herein may enable a more efficient inspection and maintenance of the facilities 20, 106 and the equipment 18, 104. Indeed, the transfer of multiple categories of data may be provided, as described in more detail below with respect to FIG. 6.

Figure 6:
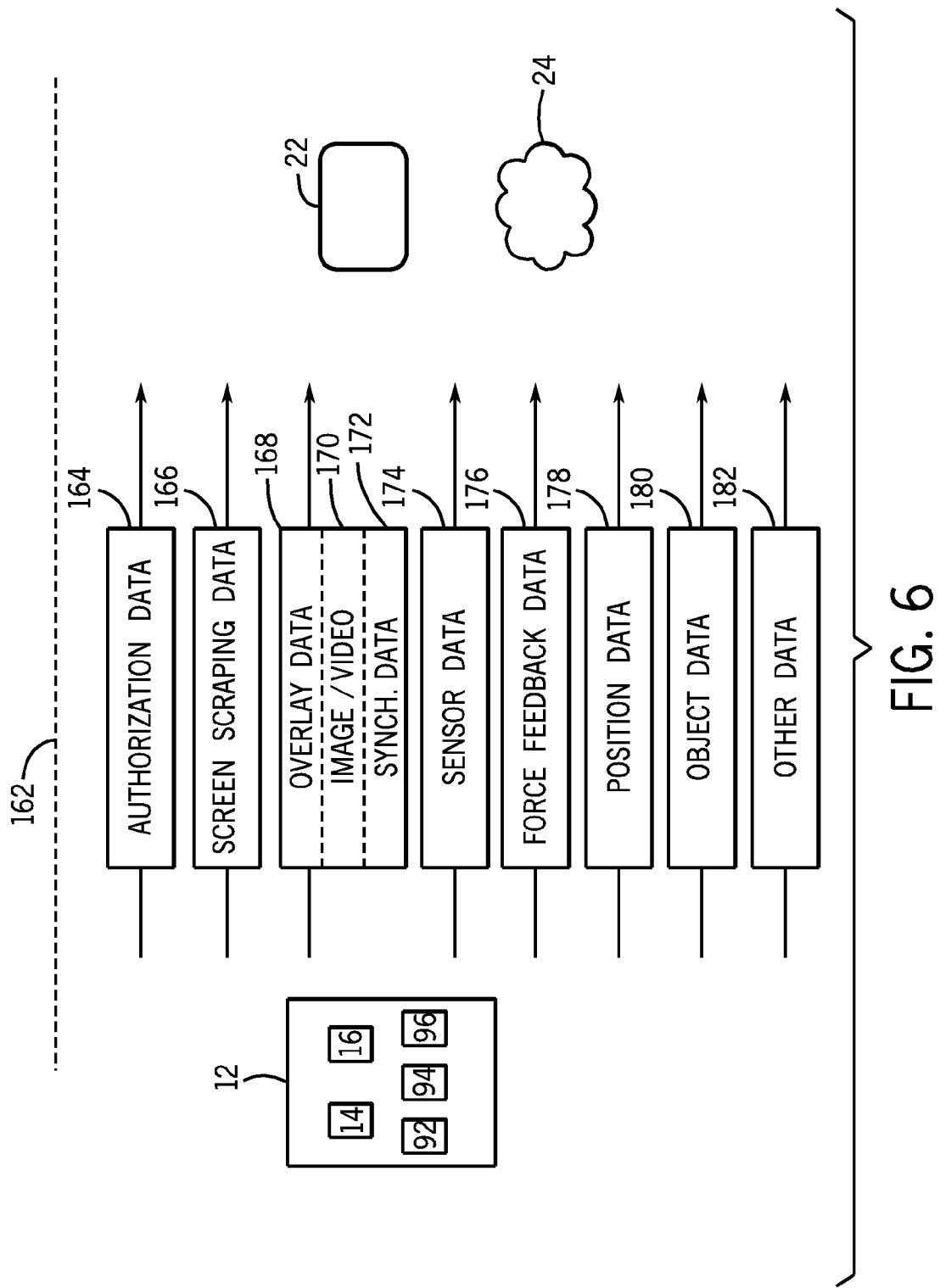
FIG. 6 is a block diagram of an embodiment of information flow through a wireless conduit.

FIG. 6 is a data flow diagram depicting an embodiment of the flow of various data categories originating from the NDT inspection devices 12 (e.g., devices 14, 16, 92, 94, 96) and transmitted to the mobile device 22 and/or the cloud 24. As mentioned above, the NDT inspection devices 12 may use a wireless conduit 162 to transmit the data. In one embodiment, the wireless conduit 112 may include WiFi (e.g., 802.11X), cellular conduits (e.g., HSPA, HSPA+, LTE, WiMax), NFC, Bluetooth, PANs, and the like. The wireless conduit 162 may use a variety of communication protocols, such as TCP/IP, UDP, SCTP, socket layers, and so on. In certain embodiments, the wireless conduit 162 may include secure layers, such as SSL, VPN layers, encrypted layers, challenge key authentication layers, token authentication layers, and so on. Accordingly, an authorization data 164 may be used to provide any number of authorization or login information suitable to pair or otherwise authenticate the NDT inspection device 12 to the mobile device 22 and/or the cloud 24. Additionally, the wireless conduit 162 may dynamically compress data, depending on, for example, currently available bandwidth and latency. The mobile device 22 may then uncompress and display the data. Compression/decompression techniques may include H.261, H.263, H.264, moving picture experts group (MPEG), MPEG-1, MPEG-2, MPEG-3, MPEG-4, DivX, and so on.

In certain modalities (e.g., visual modalities), images and video may be communicated by using certain of the NDT inspection devices 12. Other modalities may also send video, sensor data, and so on, related to or included in their respective screens. The NDT inspection device 12 may, in addition to capturing images, overlay certain data onto the image, resulting in a more informative view. For example, a borescope tip map may be overlaid on the video, showing an approximation of the disposition of a borescope tip during insertion so as to guide the operator 26 to more accurately position the borescope camera 126. The overlay tip map may include a grid having four quadrants, and the tip 136 disposition may be displayed as dot in any portion or position inside of the four quadrants. A variety of overlays may be provided, as described in more detail below, including measurement overlays, menu overlays, annotation overlays, and object identification overlays. The image and video data, such as the video 84, may then be displayed, with the overlays generally displayed on top of the image and video data.

In one embodiment, the overlays, image, and video data may be "screen scraped" from the screen 135 and communicated as screen scrapping data 166. The screen scrapping data 166 may then be displayed on the mobile device 22 and other display devices communicatively coupled to the cloud 24. Advantageously, the screen scrapping data 166 may be more easily displayed. Indeed, because pixels may include both the image or video and overlays in the same frame, the mobile device 22 may simply display the aforementioned pixels. However, providing the screen scraping data may merge both the images with the overlays, and it may be beneficial to separate the two (or more) data streams. For example, the separate data streams (e.g., image or video stream, overlay stream) may be transmitted approximately simultaneously, thus providing for faster data communications. Additionally, the data streams may be analyzed separately, thus improving data inspection and analysis.

Accordingly, in one embodiment, the image data and overlays may be separated into two or more data streams 168 and 170. The data stream 168 may include only overlays, while the data stream 170 may include images or video. In one embodiment, the images or video 170 may be synchronized with the overlays 168 by using a synchronization signal 172. For example, the synchronization signal may include timing data suitable to match a frame of the data stream 170 with one or more data items included in the overlay stream 168. In yet another embodiment, no synchronization data 172 data may be used. Instead, each frame or image 170 may include a unique ID, and this unique ID may be matched to one or more of the overlay data 168 and used to display the overlay data 168 and the image data 170 together.

The overlay data 168 may include a tip map overlay. For example, a grid having four squares (e.g., quadrant grid) may be displayed, along with a dot or circle representing a tip 136 position. This tip map may thus represent how the tip 136 is being inserted inside of an object. A first quadrant (top right) may represent the tip 136 being inserted into a top right corner looking down axially into the object, a second quadrant (top left) may represent the tip 136 being inserted into a left right corner looking down axially, a third quadrant (bottom left) may represent the tip 136 being inserted into a bottom left corner, and a fourth quadrant (bottom right) may represent the tip 136 being inserted into a bottom right corner. Accordingly, the borescope operator 26 may more easily guide insertion of the tip 136.

The overlay data 168 may also include measurement overlays. For example, measurement such as length, point to line, depth, area, multi-segment line, distance, skew, and circle gauge may be provided by enabling the user to overlay one or more cursor crosses (e.g., "+") on top of an image. In one embodiment a stereo probe measurement tip 136, or a shadow probe measurement tip 136 may be provided, suitable for measurements inside of objects, including stereoscopic measurements and/or by projecting a shadow onto an object. By placing a plurality of cursor icons (e.g., cursor crosses) over an image, the measurements may be derived using stereoscopic techniques. For example, placing two cursors icons may provide for a linear point-to-point measurement (e.g., length). Placing three cursor icons may provide for a perpendicular distance from a point to a line (e.g., point to line). Placing four cursor icons may provide for a perpendicular distance between a surface (derived by using three cursors) and a point (the fourth cursor) above or below the surface (e.g., depth). Placing three or more cursors around a feature or defect may then give an approximate area of the surface contained inside the cursors. Placing three or more cursors may also enable a length of a multi-segment line following each cursor.

Likewise, by projecting a shadow, the measurements may be derived based on illumination and resulting shadows. Accordingly, by positioning the shadow across the measurement area, then placing two cursors as close as possible to the shadow at furthermost points of a desired measurement may result in the derivation of the distance between the points. Placing the shadow across the measurement area, and then placing cursors at edges (e.g., illuminated edges) of the desired measurement area approximately to the center of a horizontal shadow may result in a skew measurement, otherwise defined as a linear (point-to-point) measurement on a surface that is not perpendicular to the probe 14 view. This may be useful when a vertical shadow is not obtainable.

Similarly, positioning a shadow across the measurement area, and then placing one cursor on a raised surface and a second cursor on a recessed surface may result in the derivation of depth, or a distance between a surface and a point above or below the surface. Positioning the shadow near the measurement area, and then placing a circle (e.g., circle cursor of user selectable diameter, also referred to as circle gauge) close to the shadow and over a defect may then derive the approximate diameter, circumference, and/or area of the defect.

Overlay data 168 may also include annotation data. For example, text and graphics (e.g. arrow pointers, crosses, geometric shapes) may be overlaid on top of an image to annotate certain features, such as "surface crack." Additionally, audio may be captured by the NDT inspection device 12, and provided as an audio overlay. For example, a voice annotation, sounds of the equipment undergoing inspection, and so on, may be overlaid on an image or video as audio. The overlay data 168 received by the mobile device 22 and/or cloud 24 may then be rendered by a variety of techniques. For example, HTML5 or other markup languages may be used to display the overlay data 168. In one embodiment, the mobile device 22 and/or cloud 24 may provide for a first user interface different from a second user interface provided by the NDT device 12. Accordingly, the overlay data 168 may be simplified and only send basic information. For example, in the case of the tip map, the overlay data 168 may simply include X and Y data correlative to the location of the tip, and the first user interface may then use the X and Y data to visually display the tip on a grid.

Additionally sensor data 174 may be communicated. For example, data from the sensors 126, 140, and x-ray sensor data, eddy current sensor data, and the like may be communicated. In certain embodiments, the sensor data 174 may be synchronized with the overlay data 168, for example, overlay tip maps may be displayed alongside with temperature information, pressure information, flow information, clearance, and so on. Likewise, the sensor data 174 may be displayed alongside the image or video data 170.

In certain embodiments, force feedback or haptic feedback data 176 may be communicated. The force feedback data 176 may include, for example, data related to the borescope 14 tip 136 abutting or contacting against a structure, vibrations felt by the tip 136 or vibration sensors 126, force related to flows, temperatures, clearances, pressures, and the like. The mobile device 22 may include, for example, a tactile layer having fluid-filled microchannels, which, based on the force feedback data 176, may alter fluid pressure and/or redirect fluid in response. Indeed, the techniques describe herein, may provide for responses actuated by the mobile device 22 suitable for representing sensor data 174 and other data in the conduit 162 as tactile forces.

The NDT devices 12 may additionally communicate position data 178. For example, the position data 178 may include locations of the NDT devices 12 in relation to equipment 18, 104, and/or facilities 20, 106. For example, techniques such as indoor GPS, RFID, triangulation (e.g., WiFi triangulation, radio triangulation) may be used to determine the position 178 of the devices 12. Object data 180 may include data related to the object under inspection. For example, the object data 180 may include identifying information (e.g., serial numbers), observations on equipment condition, annotations (textual annotations, voice annotations), and so on. Other types of data 182 may be used, including but not limited to menu-driven inspection data, which when used, provides a set of pre-defined "tags" that can be applied as text annotations and metadata. These tags may include location information (e.g., 1$^{st}$ stage HP compressor) or indications (e.g., foreign object damage) related to the object undergoing inspection. Other data 182 may additionally include remote file system data, in which the mobile device 22 may view and manipulate files and file constructs (e.g., folders, subfolders) of data located in the memory 25 of the NDT inspection device 12. Accordingly, files may be transferred to the mobile device 22 and cloud 24, edited and transferred back into the memory 25. By communicating the data 164-182 to the mobile device 22 and the cloud 24, the techniques described herein may enable a faster and more efficient process 150. By communicating the data 164-182 to the mobile device 22 and the cloud 24, the techniques described herein may enable a faster and more efficient process 150. Indeed, the transfer of multiple categories of data may be provided, as described in more detail below with respect to FIGS. 7-10.

Figure 7:
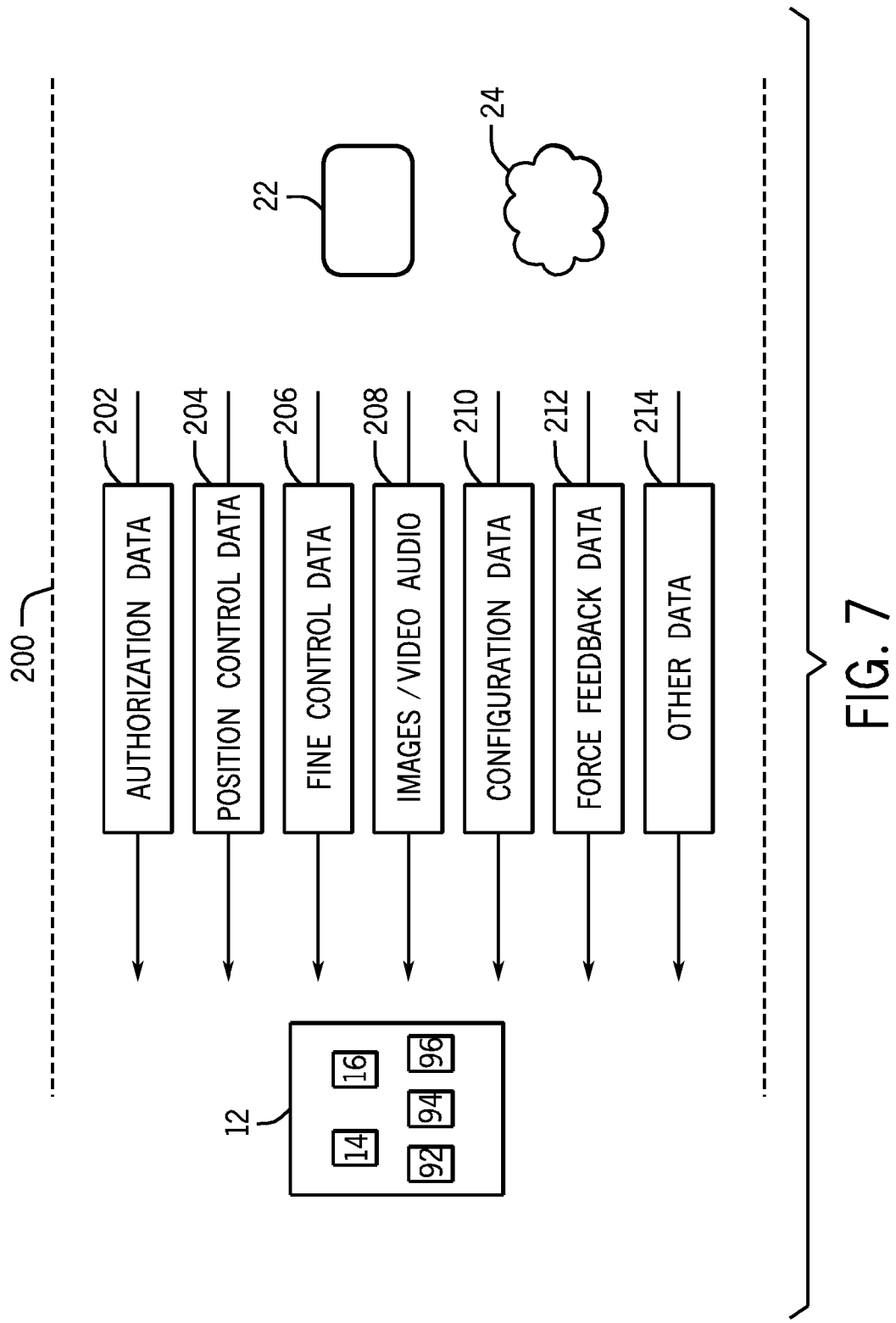
FIG. 7 is a block diagram of an embodiment of information flow through a wireless conduit of information useful in remote control of the NDT inspection system of FIG. 1.

Turning now to FIG. 7, the figure is a data flow diagram illustrating an embodiment of the flow of various data categories originating from the mobile device 22, devices inside the cloud 24, and/or devices communicatively connected to the cloud 24 (e.g., computing system 29) and directed, for example, towards the NDT inspection devices 12 (e.g., borescope 14, PTZ camera 16, eddy current inspection device 92, ultrasonic flaw detector 94, digital radiography device 96). Such data may include control data suitable for controlling the NDT device. As described herein, the control of the NDT inspection devices 12 includes both control of positioning apparatus, such as the articulating section 122 of the borescope 14, apparatus used to pan, tilt, and zoom the PTZ camera 16, as well as the remote control of file systems in the NDT devices 12, screen(s) included in the NDT devices 12, and the setting of parameters used to operate or to configure the NDT devices 12, as described in more detail below.

In the depicted embodiment, a wireless conduit 200 may be used to communicate the data (e.g. control data) to the NDT devices 12. Similar to the conduit 162, the wireless conduit, in certain embodiments, may include WiFi (e.g., 802.11X), cellular conduits (e.g., HSPA, HSPA+, LTE, WiMax), NFC, Bluetooth, PANs, and the like. The wireless conduit 162 may use a variety of communication protocols, such as TCP/IP, UDP, SCTP, socket layers, and so on. In certain embodiments, the wireless conduit 162 may include secure layers, such as SSL, VPN layers, encrypted layers, challenge key authentication layers, token authentication layers, and so on. It is to be noted that, in other embodiments, wired conduits may be used alternative to or in lieu of the wireless conduits 162, 200.

Authorization data 202 may be communicated, and used, for example, in conjunction with the authorization data 164 to enable secure access to the NDT devices 12. A variety of secure authentication techniques may be used, including but not limited to login/password combinations, maintaining a list of secure MAC addresses, challenge-response authentication between two or more of the devices 12, 22, and cloud 24, secure NFC authentication, using a third-party authentication server (e.g., by using certificate authentication, key exchange authentication), and so on.

Position control data 204 may additionally be communicated, useful to move or otherwise position components of the NDT devices 12. Indeed, certain components of the NDT devices 12 may be physically moved remotely by using, for example, a virtual joystick described in more detail below with respect to FIG. 8. Any number of systems (e.g., mobile devices 22, computing systems 29, web-based virtual controllers), such as devices connected to the NDT devices 12 locally (e.g., WiFi, Bluetooth) and/or via the cloud 24, may be used to remotely communicate the data 204 and used to remotely position components of the NDT devices 12.

Advantageously, a variety of remote operations, training, and collaboration may be enabled. For example, an expert operator may train a new borescope operator on the job. The new borescope operator may hold the borescope 14 and observe while the expert operator controls the borescope 14 by using the mobile device 22. The expert operator may then point out tip control techniques, relate what type of observations are correlative to corrosion, show how to make annotations, and so on. In other cases, the expert operator may be located at a different geographic location and may collaborate and/or train the new borescope operator by the use of VOIP, whiteboarding, and the like, or may use the mobile device 22 to perform a full inspection remotely. In another training example, the new borescope operator may be using the mobile device 22 and/or borescope 14, and receive training from remote locations, such as web-based locations. For example, the screen 137 of the mobile device 22 may be portioned into multiple viewing areas (e.g., "splitscreens") so that one viewing area shows borescope 14 images or video while a second viewing area shows a training video, and a third area shows an online equipment manual procured wirelessly. Indeed, the boresecope 14 may receive data, including targeted multimedia inspection data from external sources (e.g., mobile device 22, cloud 24, computing system 29).

Additionally, fine control data 206 may be communicated. For example, "jogging" data suitable for moving the borescope's articulating section 122 and/or the PTZ camera 16 at smaller increments than the position control data 204. More specifically, the fine control data 206 may include a step to move (e.g., 0.5 mm, between 0.05 mm and 1 cm or more), and a number of steps to move (e.g., 1, 2, 3, 4, 5 or more). Accordingly, components of the NDT device 12 may be more precisely disposed to better observe certain features undergoing inspection. The position control data 204 and fine control data 206 may be produced by virtual controllers or physical controllers communicatively connected to the NDT devices 12.

Images, video, text, and/or audio data 208 may be additionally communicated. For example, the mobile device 22, the cloud 24, and/or devices coupled to the cloud (e.g., computing system 29) may send images and/or video, as well as overlay annotations useful in illustrating to the borescope operator certain features to inspect further, along with audio detailing explanations of how to proceed with the inspection. In certain embodiments, the data 208 may be training data useful in detailing inspection procedures. In other embodiment, the data 208 may include data transmitted from experts, detailing instructions on how to more thoroughly inspect certain equipment. In yet another embodiment, the data 208 may include data sent through automated entities (e.g., expert systems, fuzzy logic systems, neural network systems, state vector machines) based on received data from FIG. 6 useful in directing and/or focusing the inspection after automatically analyzing the received data.

Configuration data 210 may also be communicated. For example data used to update file systems included in the NDT devices 12, to reprogram the NDT devices 12, to set parameters useful in operating the NDT devices 12, and/or to reconfigure electronic components of the device 12 (e.g., flash upgrade) may be sent to the NDT inspection devices 12 remotely. Indeed, programming and parameter-setting may be done remotely, thus providing for techniques to more easily maintain the NDT devices up to date, and to improve device operations. It is to be understood that different NDT devices 12 may use different parameter sets. As a non-limiting example only, some parameters, e.g., used during operations of the NDT device 12 and useful to remote control the NDT devices 12 may include parameters for starting acquisition of data, stopping acquisition of data, saving a file, naming or renaming a file, adjusting a gain, adjusting a time base, compensating for lift off—zeroing signal during eddy current inspection, adjusting phase rotation, adjusting persistence, balancing a probe, adjusting gate (e.g., amplitude adjustment, position adjustment), adjusting color palette—soft gain, changing signal rectification, changing pulser filter, zooming in and out, adjusting a pulse width, adjusting a data filter (e.g., bandwidth), adjusting pulse repetition frequency, adjusting sweep angle start/stop, adjusting sweep angle increment, turning channels on/off, freezing data, clearing/erasing data, adjusting span, adjusting filters, changing spot positions, changing display types (e.g., spot display, timebase display, waterfall display), and/or changing channel views.

In one embodiment, client-server techniques, such as virtual network computing (VNC), remote desktop protocol (RDP), desktop sharing, among others, may be used to send configuration data 210 and receive data correlative with screen control of the NDT devices 12. Likewise, remote file system control may be provided by using techniques such as secure file transfer protocol (ftp), ftp over secure shell (SSH), remote file sharing (RFS), and/or distributed file systems (e.g., using the cloud 24 to store and retrieve files through the NDT devices 12). Files may be added, renamed, deleted, and/or updated. Likewise, file folders and other file storage structures may be similarly renamed, deleted, and/or updated.

Force feedback data 212 may additionally be communicated. For example, a more forceful push onto the mobile device's 22 touchscreen may translate into data 212 useful in moving the borescope's articulating section 122 more quickly. Likewise, a haptic controller may be coupled to the computing device 29 and provide the force feedback data. The more force applied, the faster the correlative movement of components such as the articulating section 122 of the borescope 14. It is to be noted that force feedback data 212 may be provided by other devices, such as the physical joystick 131, a virtual joystick described in more detail with respect to FIG. 8 below, haptic controllers wirelessly coupled to the NDT devices 12, including controllers coupled through the cloud 24 or mobile device 22 (e.g., when the mobile device 22 is providing for WAP functionality). Other data 214 may include updated digital manuals or help manuals useful in operating the NDT devices 12, manuals relating to the equipment (e.g., turbomachinery 18, aircraft 54) undergoing inspection, and so on. Accordingly, the wireless conduit 200 would be used to communicate and to change or otherwise modify NDT device 12 information, such as borescope-specific information including but not limited to measurement information (cursor placement, measurements, stereo matches), MDI information (current stage, asset information, reference material), current menu selections, tip temperatures/pressures, tip orientation (tip map, artificial horizon), 3-dimensional phase measurement (3DPM) range indication, text annotation, and so on. Software control applications may render native graphics with touchscreen buttons or softkey labels as described in more detail below, and if appropriate, accept user input. Hard physical buttons with either fixed or dynamic functionality can also be used to accept input. It is to be noted that the NDT device 12 may be controlled by a first entity (or more than one remote entities) at the same time as the NDT device 12 is used by a second entity. Indeed, the control embodiments described herein enable multiple parties to control the device at the same time, including multiple remote parties.

Figure 8:
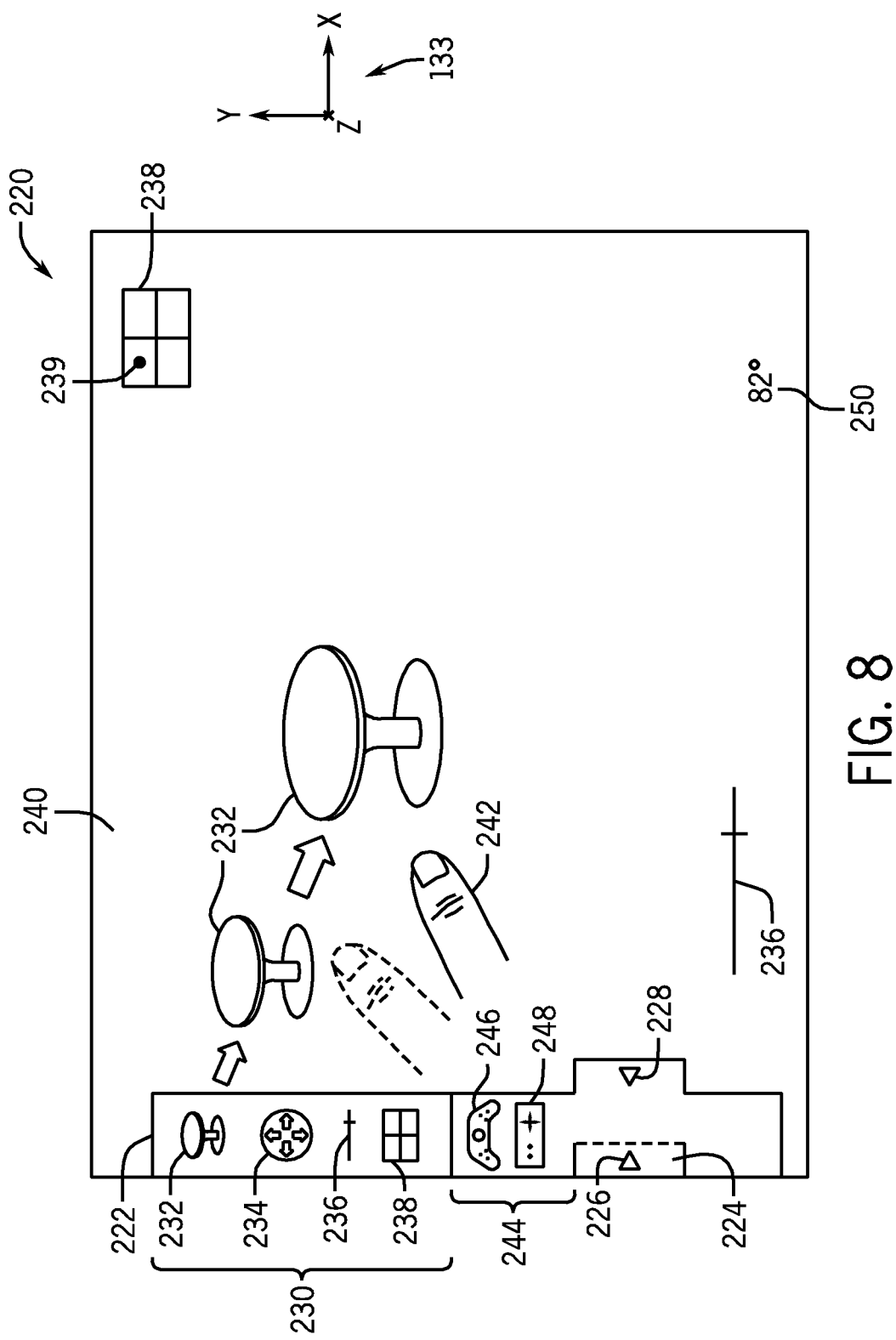
FIG. 8 is a screen view of an embodiment of a virtual joystick.

FIG. 8 is illustrative of an embodiment of a screen view 220 useful in remote controlling the NDT devices 12. The screen view 220 may be included in the mobile device 22 (e.g., tablet, cell phone, notebook touchscreen). The screen view 220 may be implemented by using non-transitory computer-readable instructions stored, for example, in the memory 25 of the mobile device 22. In the depicted embodiment, an interface bar 222 may be activated, for example, by "swiping" a tab control 224. Once activated, the tab control 224 may change icons, from a right arrow icon 226 to a left arrow icon 228, denoting preferred swiping direction.

In a section 230 of the interface bar 222, a plurality of virtual controls may be displayed. The depicted virtual controls include a virtual joystick 232, a virtual control pad 234, a slider 236, and a tip map 238 showing a position 239 of the tip 136. Other virtual controls may be provided, as described in more detail below with respect to FIG. 9. The virtual controls may be displayed on a screen 240 of a control software application executable, for example, by the processor 23 of the mobile device 22, and used to control one or more components of the NDT devices 12. In the depicted example, a finger 242 is used to move the virtual joystick 232 into a desired location. Indeed, all of the virtual controls 234, 236, 238 may be similarly disposed onto any area of the screen 240. The virtual controls 232, 234, 236, 238 are resizable. Additionally, techniques such as "pinch-to-zoom," may be used to resize the controls 232, 234, 236, 238 to a desired size.

Once the virtual controls are positioned into desired locations of the screen 240, a section 244 of the screen may store a customized template 246 that include the saved positions and sizes for the screen 240 controls. Other templates 248 may be provided, for example, via the cloud 24, from a variety of sources, including the manufacturer for the NDT devices 12, equipment 18, 54 manufacturers, shops that service the equipment 18, 54, software vendors, and the like. The templates 248 may store a plurality of virtual controls and certain placement and sizes originally provided by the template 248. In certain embodiments, the template(s) 248 may be downloaded automatically based on the type of NDT device 12 selected (e.g., 14, 16, 92, 94, 96), the location of the NDT device 12, such as proximity to a specific model and/or serial number of the equipment 18, 54. Indeed, control templates 248 specific to certain equipment and/or facilities may be automatically downloaded based on the selected NDT device 12 and/or proximity of the NDT device 12 to the aforementioned equipment or facility.

In the depicted example of the screen 240, the virtual joystick 232 may be used to control the articulating section 122 of the borescope 14. The tip map 238 may then be used to show a location of the tip 136 when disposed inside of the equipment undergoing inspection. Lights 128, 138 may be controlled by using the slider 236, and a temperature may be displayed by using a text control 250. The entirety of the screen 240, or a portion of the screen 240, may then be used to display an image or video captured, for example, by using the borescope camera 126 or the camera 16. By providing for dynamic, reconfigurable screens 240, the techniques described herein may enable a more efficient and thorough inspection 154.

Figure 9:
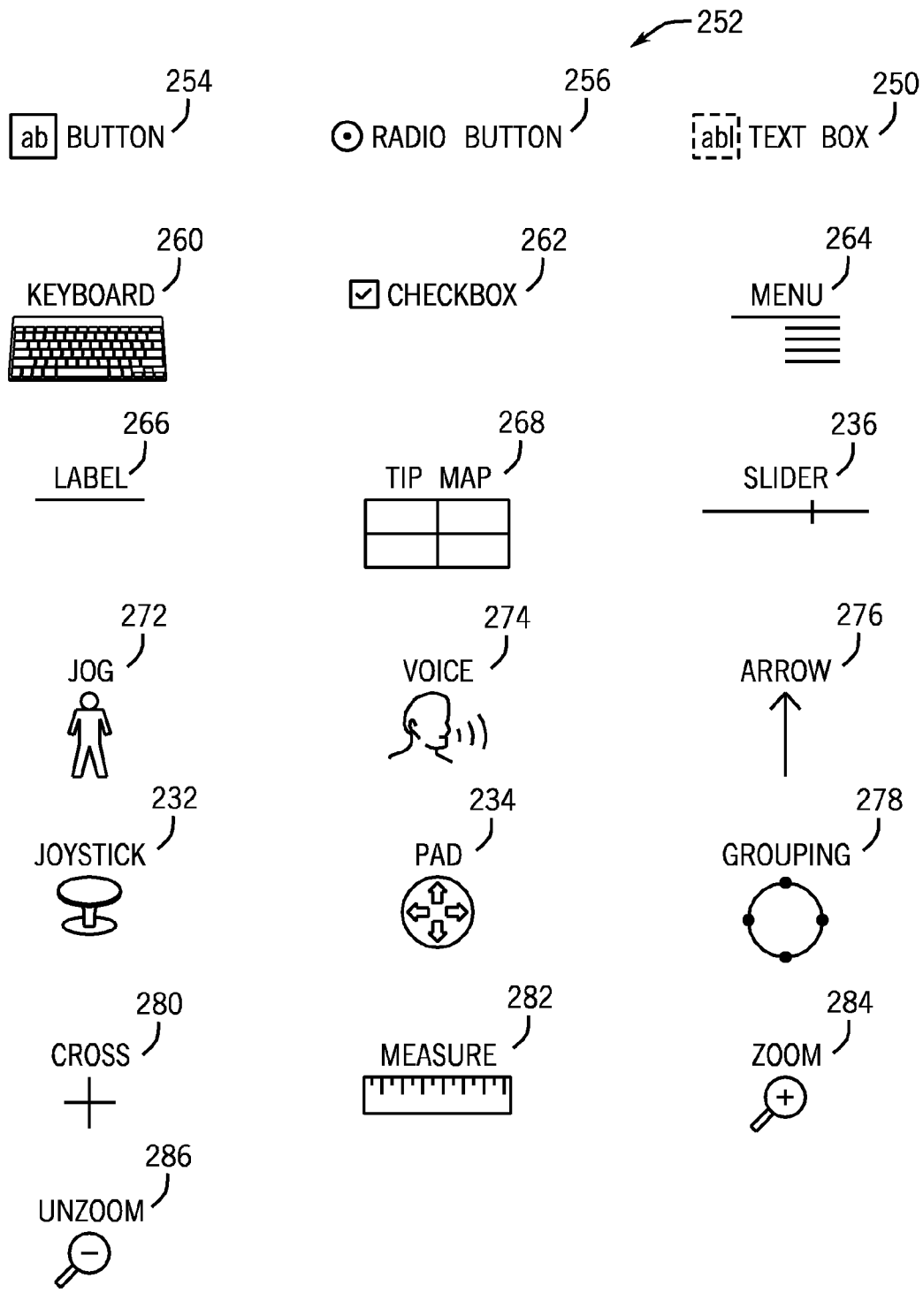
FIG. 9 is a view of embodiments of a plurality of virtual controls.

Turning to FIG. 9, the figure depicts a non-exhaustive list of embodiments of virtual controls that may be disposed on the screen 240 of FIG. 8. For example, a button control 254 may be used to activate or deactivate components (hardware or software components) of the NDT device 12 and/or mobile device 22. A radio button 256 may be used to select or deselect components of the NDT device 12 and/or mobile device 22. The textbox control 250, also shown in FIG. 8, may be used to display any number of textual data (e.g., sensor data, annotations, notes, time/date, parameter settings, and so on). A keyboard control 260 may be used to display a virtual keyboard suitable for the typing of data. A checkbox control 262 may be used to check or uncheck features (hardware or software features) of the NDT device 12 and/or mobile device 22. A menu control 264 may be used to display MDI data and other menu related data. A label control 266 may be used to display a static text or graphic label, as desired. A tip map control 268 may be used to display a current tip 136 position.

Likewise, the slider control 236 (also shown in FIG. 8) may be used to adjust any number of hardware or software components, parameters, and so on by "sliding" to a desired level. A jog control 272 may be used to "jog" the fine control data 206, or to set properties associated with the fine control data 206 (e.g., steps to move, number of steps to move). A voice control 274 may be used to provide voice commands, voice annotations, VOIP conversations, and so on. An arrow control 276 may be used to point to image or video features. The joystick 232 and control pad 234 (also shown in FIG. 8) may be used to manipulate certain components (e.g., articulating section 122 of the borescope 14) to dispose the components into a desired position.

Similarly, a grouping control 278 may be used to "lasso" or group components in order to move the components, delete the components from the screen 240, and so on. A cross 280 cursor may be used to mark or otherwise indicate certain locations on the screen 240 correlative with features of an image or video. A measure component 282 may then use, for example, the one or more crosses 280 to derive measurements, such as the stereoscopic and/or shadow measurements described above with respect to FIG. 6. Zoom controls 284 and unzoom controls 286 may be used to zoom into or out of certain portions (or all) of the screen 240. By providing for resizable, repositionable virtual controls 252, the techniques described herein may enable a more efficient use of space of the screen 240, and provide for customizable, dynamic screens 240.

Figure 10:
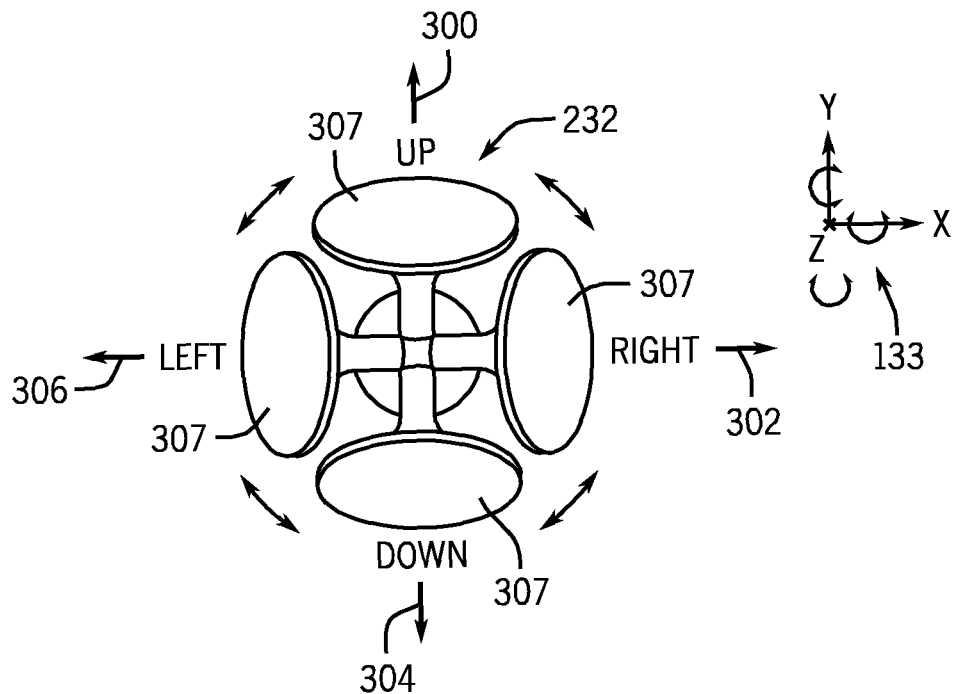
FIG. 10 is a view of a plurality of positions for the virtual joystick of FIG. 8, in accordance with one embodiment.

Some of the controls, such as the virtual joystick 232, may be disposed in a variety of orientations as shown in an embodiment illustrated in FIG. 10. In the depicted embodiment, the virtual joystick 232 is shown in four different orientations 300, 302, 304, and 306. More specifically, the orientation 300 positions the joystick 232 parallel to the Y axis with a joystick head 307 in an "up" position, the orientation 302 positions the joystick 232 parallel to the X axis with the joystick head 307 in a "left" position, the orientation 304 positions the joystick 232 parallel to the Y axis with the joystick head 307 in a "down" position, and the orientation 306 positions the joystick 232 parallel to the X axis with the joystick head 307 in a "left" position. Other orientations may be chosen to position the virtual joystick 232, for example, orientations parallel to the Z-axis, or at any angle with respect to the XY plane, XZ plane, and or YZ plane. Additionally, the virtual joystick 232 and/or virtual control pad 234 may be adjusted to vary a sensitivity of manipulation. That is, when using the touchscreen 135, 137, it may be useful to allow user control of the sensitivity of the joystick, such that the user may configure what level of touch or movement is desired to "move" the virtual control (e.g., 232, 234) a given amount. Accordingly, the joystick 232 may provide for a more flexible interface useful in controlling a variety of NDT devices 12.

Figure 11:
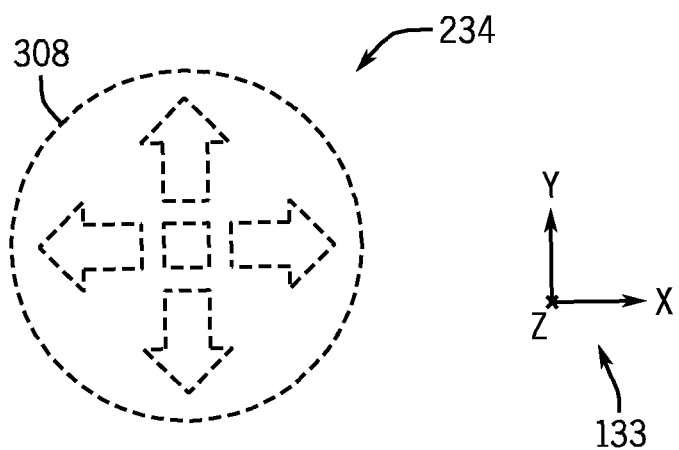
FIG. 11 is a view of an embodiment of a translucent control pad.

In some embodiments, such as the embodiment depicted in FIG. 11, the virtual controls shown in FIG. 9 may be displayed as opaque or translucent visualizations. For example, the control pad 234 is shown as having a transparent body with certain features 308 visualized in outline form. By providing for opaque or translucent visualizations, images or video displayed underneath the controls of FIG. 9 may be more easily viewed, and the inspection 154 may be more easily performed.

Figure 12:
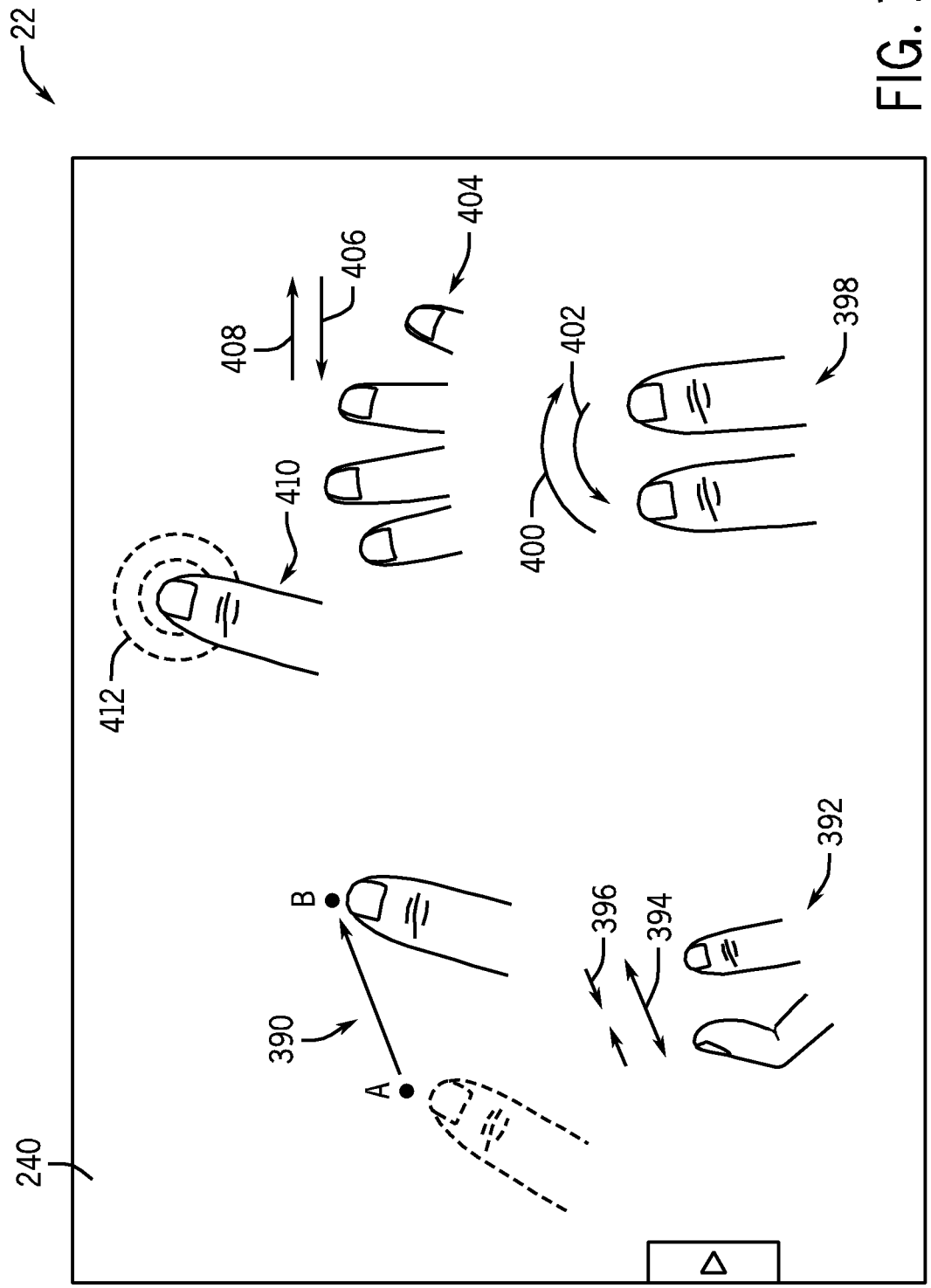
FIG. 12 is a view of a plurality of gesture controls, in accordance with one embodiment.

In some cases, it may be desirable to control to the NDT devices 12 by using gesture control in lieu of the joystick 232 or the control pad 234, or additional to the controls 232, 234. Accordingly, screen 240 space may be maximized. FIG. 12 depicts a non-inclusive example of embodiments of a plurality of gestures that may be used to control the NDT devices 12. A single digit or finger gesture 390 may be used to define a vector AB with a starting point A and an ending point B. The direction of the vector AB may then be used to move desired components along the vector AB, and the length of the vector AB may provide for the length of the movement. Pinch-to-zoom gestures 392 may also be used. For example, spreading two fingers outwardly along a line 394 may zoom certain portions of the screen 240. Likewise moving two fingers inwardly along a line 396 may unzoom certain portions of the screen 240.

Rotational gestures 398 may also be provided. For example, rotating one or two fingers to follow arcs 400 and 403 may correlatively rotate desired components of the NDT device 12. Multi-gesture control 404 is also provided. For example, using three fingers or more and swiping in directions 406, 408 may shift the screen 240 to display an entirely new screen, such as a screen containing a different set of virtual controls or a different software application. Force feedback gestures 410 or techniques may additionally be used. For example, pressing a finger with a force 412 may result in a movement of a desired component correlative to the force 412. The stronger the force 412, the faster the movement. Likewise, the force 412 may be used, such as when tapping on the screen 240, to provide for jogging or fine control of desired components.

Figure 13:
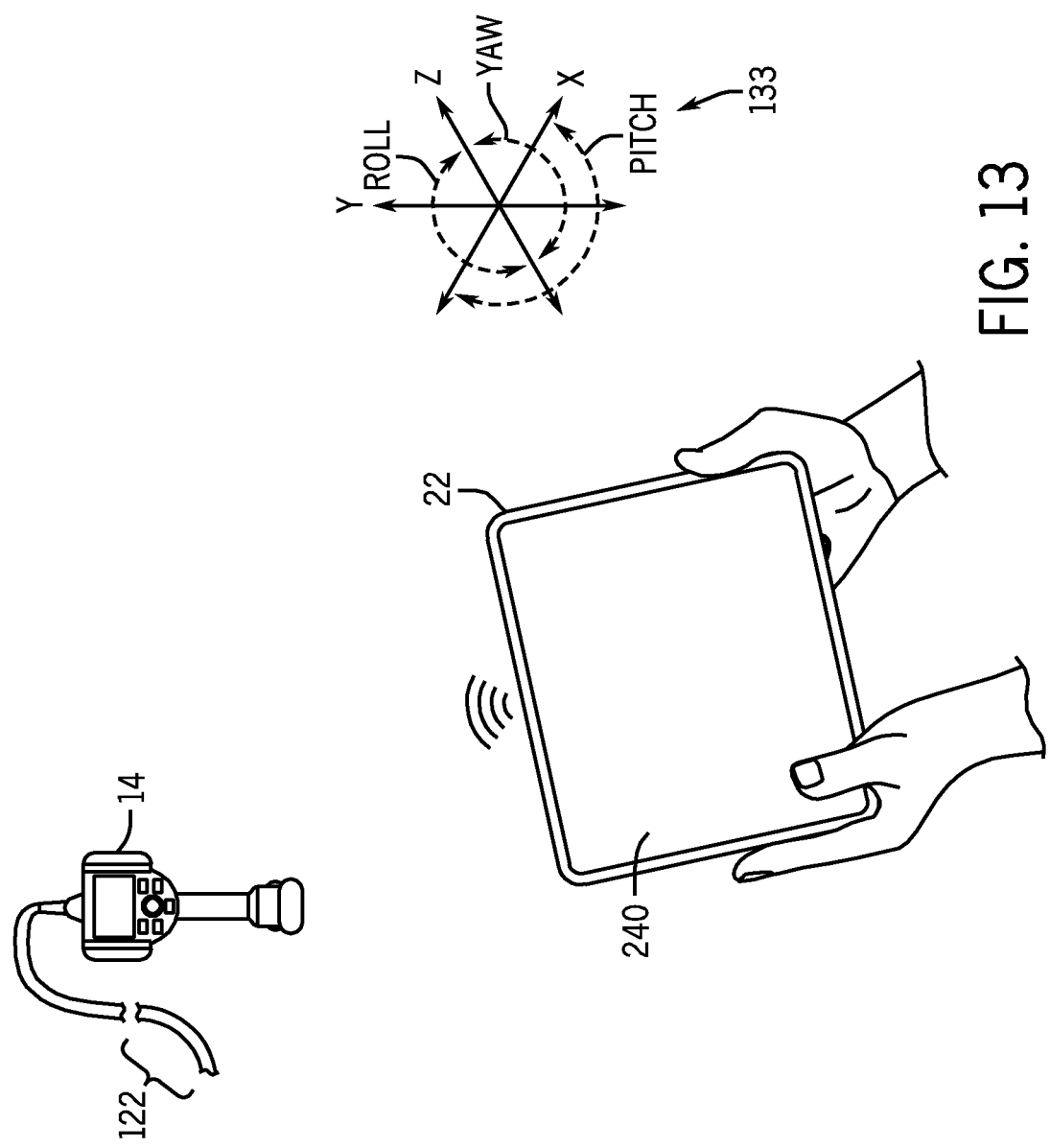
FIG. 13 is a perspective view on an embodiment of the mobile device of FIG. 1 suitable for motion and/or voice control.

In certain embodiments, the mobile device 22 may include accelerometers, gyroscopes, and other sensors useful in deriving motion and/or orientation of the mobile device 22. Accordingly, as depicted in FIG. 13, moving and/or changing orientations of the mobile device 22 may be used to control features of the NDT devices 12, such as the articulating section 122 of the borescope 14. Indeed, by virtually "driving" the mobile device 22 it may be possible to remotely control the NDT devices 12. Six degrees of freedom of movement may be derived with respect to the axes 133, such as movements perpendicular to the X, Y, Z axes 133 (e.g., translation in the axes 133), rotations about the X, Y, Z axes 133, and/or rotative movements with respect to each of the axes 133 (e.g., pitch, yaw, roll). The movements may be derived and subsequently mapped to correlative movements of the NDT devices 12, such as movements of the articulating section 122 of the borescope 14, and pan/tilt/zoom movements of the PTZ camera 16. By providing for the virtual driving of the mobile device 22, it may be possible to further maximize screen 240 space, for example, by not including the joystick 232 and the control pad 234.

Voice commands may be provided, additional or alternative to the aforementioned virtual controls. For example, voice may be processed by the NDT devices 12, by the mobile device 22, by the cloud 24, by devices coupled to the cloud 24 (e.g., device 29), or by a combination thereof, to parse voice into useful commands. All aspects of the NDT devices 12 may be controlled using voice, including positioning components of the NDT devices 12 (e.g., articulating section 122 of the borescope 12), recording images and video, providing for annotations, controlling parameters as described above, and so on.

Accordingly, the user 28 may view live video from the borescope 14 on the mobile device 22, and may articulate the borescope tip 136 by swiping on the screen or tapping on the edges to indicate a jog direction. The user 28 may additionally or alternatively view live video from the borescope 14 on the mobile device 22, and may summon the virtual joystick 232 or control pad 234 to the screen 240 on the mobile device 22. The virtual joystick 232 or control pad 234 may then be used to articulate the borescope 14. Likewise, the user 28 may view live video on the mobile screen 240, find a region of interest, and command the borescope 14 to take a snapshot (still image). Similarly, the user 28 may view live video on the mobile screen 240, find a region of interest, and command the borescope 14 to take a snapshot (still image), and then perform a measurement (e.g., by using cursor placements on the image, including 3DPM captures, shadow captures, stereo captures). The user 2 may also view live video on the mobile screen 249, and then command a view of the borescope's file system in order to view and transfer previously captured still images and videos to the mobile device 22, to the cloud 24 and to systems (e.g., computing system 29) coupled to the cloud 24. The mobile device 22 can command viewing and/or execution of any of the borescope's menus. Indeed, all functions that may be done by the operator 26 may be done remotely by the operator 28 using the mobile device 22 and/or computing system 29. Indeed, the entire screen of the NDT device 12, such as the screen 135, may be recreated in the mobile device's screen 240 and used to control the NDT device.

Technical effects of the invention include enabling remote control of the NDT devices 12. The remote control may include positional control of mechanical components, remote control of the file systems included in the NDT devices 12, remote control of parameters of the NDT devices 12, including parameters used for operations of the NDT devices 12 and parameters used to configure the NDT devices 12. Further, the NDT devices 12 may be reprogrammed remotely. A variety of virtual controls may be provided and used for remote control, including virtual controllers (e.g., joystick, pad), gesture control, motion control, and voice commands.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A non-transitory computer readable medium comprising instructions configured to:
   display a virtual joystick, a virtual control pad, or a combination thereof, on a screen of a portable computing device;
   derive control data based on a manipulation of the virtual joystick, the virtual control pad, or the combination thereof;
   communicate the control data to control a component of a handheld non-destructive testing (NDT) device, wherein the instructions are configured to operate while the handheld NDT device is being held by a human operator;
   display a second virtual joystick on a computing device disposed at a cloud computing site geographically distant from a location of the handheld NDT device;
   derive a second control data based on a manipulation of the second virtual joystick; and
   communicate the second control data via a data network to control the component of the handheld NDT device, wherein the data network comprises at least one wireless segment.

2. The non-transitory computer readable medium of claim 1, wherein the instructions configured to communicate the control data to control the handheld NDT device comprise instructions configured to:
   receive the control data by using a wireless system included in the handheld NDT device; and
   derive a control action to control the component.

3. The non-transitory computer readable medium of claim 1, wherein the handheld NDT device comprises a borescope and wherein the instructions configured to control the component comprise instructions configured to control a movement of the articulating section of the borescope to position a tip of the borescope.

4. The non-transitory computer readable medium of claim 3, comprising instructions configured to display a tip map, wherein the tip map is configured to visualize the position of the tip.

5. The non-transitory computer readable medium of claim 2, wherein the instructions configured to control the component comprise instructions configured to rotate a transportable pan-tilt-zoom (PTZ) camera about an axis, to tilt the PTZ camera with respect to the axis, and to optically zoom the PTZ camera.

6. The non-transitory computer readable medium of claim 1, comprising instructions configured to change a responsiveness to the manipulation of the virtual joystick, the virtual control pad, or the combination thereof.

7. The non-transitory computer readable medium of claim 1, wherein the instructions configured to display the virtual joystick, the virtual control pad, or the combination thereof, comprise instructions configured to display a translucent virtual joystick, a translucent virtual control pad, or the combination thereof.

8. The non-transitory computer readable medium of claim 1, comprising instructions configured to hide the virtual joystick, the virtual control pad, or the combination thereof, and to derive the control data based on using a touchscreen gesture.

9. The non-transitory computer readable medium of claim 1, comprising instructions to display the virtual joystick, the virtual control pad, or the combination thereof, at a second size, to position the virtual joystick, the virtual control pad, or the combination thereof, at a second screen position, or a combination thereof.

10. The non-transitory computer readable medium of claim 1, comprising instructions to display the virtual joystick, the virtual control pad, or the combination thereof, at an orientation with respect to a XY plane, and XZ plane, a YZ plane, or a combination thereof.

11. A system comprising:
   a handheld non-destructive testing (NDT) device comprising a borescope, the borescope comprising:
   a first housing;
   a touchscreen disposed on the first housing,
   and a processor configured to:
      display an image or a video based on a signal transmitted from a sensor disposed on a borescope end of the borescope, on the touchscreen;

derive a control data based on a manipulation of the touchscreen, a manipulation of a physical directional input device disposed on a second housing included in a second NDT device, or a combination thereof; and communicate the control data to control a component of the handheld non-destructive testing (NDT) device to move the borescope end.

12. The system of claim 11, wherein the processor is configured to derive the control data based on a manipulation of a virtual joystick, a virtual control pad, or the combination thereof, displayed on the touchscreen.

13. The system of claim 11, wherein the processor is configured to derive the control data based on a touchscreen gesture.

14. The system of claim 13, wherein the touchscreen gesture comprises a single digit gesture, a pinch-to-zoom gesture, a rotational gesture, a multi-digit gesture, a tapping gesture, or a combination thereof, using a finger or a stylus.

15. The system of claim 11, wherein the processor is configured to display a file system included in the borescope on the touchscreen and to control the file system.

16. The system of claim 11, wherein the processor is configured to display a region of interest on the touchscreen based on the image or the video and to perform a measurement on the region of interest via a measurement overlay displayed on the touchscreen.

17. A method comprising:

displaying a first virtual joystick, a first virtual control pad, or a combination thereof, on a first touchscreen of a handheld non-destructive testing (NDT) device;

displaying a second virtual joystick, a second virtual control pad, or a combination thereof, on a second touchscreen of a computing device;

deriving control data based on a manipulation of the first virtual joystick, the first virtual control pad, the second virtual joystick, the second virtual control pad, or the combination thereof; and communicating the control data to control a component of the handheld non-destructive testing (NDT) device.

18. The method of claim 17, wherein communicating the control data to control the handheld NDT device comprises communicating the control data by using a cloud computing system.

19. The method of claim 17, wherein communicating the control data to control the component comprises communicating a borescope control data configured to control an articulating section of a borescope to position a tip.

20. The method of claim 19, comprising displaying a tip map, wherein the tip map is configured to visualize the position of the tip.

21. The non-transitory computer readable medium of claim 1, comprising instructions configured to:

display a third virtual joystick on a computing device;

derive a third control data based on a manipulation of the third virtual joystick; and communicate the third control data via the data network to control the component of the handheld NDT device.

22. The system of claim 11, wherein the physical directional input device comprises a physical joystick.

* * * * *